US010628995B2

(12) United States Patent
Chen et al.

(10) Patent No.: US 10,628,995 B2
(45) Date of Patent: Apr. 21, 2020

(54) ANTI-ALIASING OF GRAPHICAL ELEMENTS DEFINED BASED ON FUNCTIONS

(71) Applicant: Microsoft Technology Licensing, LLC, Redmond, WA (US)

(72) Inventors: Tong Chen, Bellevue, WA (US); Karim Audrey Luccin, Redmond, WA (US); Morien Thomas, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 49 days.

(21) Appl. No.: 15/499,842

(22) Filed: Apr. 27, 2017

(65) Prior Publication Data

US 2018/0300858 A1   Oct. 18, 2018

Related U.S. Application Data

(60) Provisional application No. 62/486,397, filed on Apr. 17, 2017.

(51) Int. Cl.
*G06T 15/50*   (2011.01)
(52) U.S. Cl.
CPC ........ *G06T 15/503* (2013.01); *G06T 2200/12* (2013.01); *G06T 2210/62* (2013.01)
(58) Field of Classification Search
CPC ....... G06T 5/002; G06T 19/20; G06T 15/503; G06T 2210/62; G06T 2207/20192
See application file for complete search history.

(56) References Cited

U.S. PATENT DOCUMENTS

| 6,377,229 | B1 | 4/2002 | Sullivan |
| 6,982,724 | B2 | 1/2006 | Frisken et al. |
| 7,825,923 | B2 | 11/2010 | Fenney et al. |
| 7,849,414 | B2 | 12/2010 | Kan et al. |
| 8,294,730 | B2* | 10/2012 | Tremblay ............. G06T 11/203 345/426 |
| 8,773,423 | B2* | 7/2014 | Sun ........................ G06T 17/20 345/419 |
| 8,878,900 | B2 | 11/2014 | Yang et al. |
| 9,384,589 | B2 | 7/2016 | Andrews et al. |

(Continued)

OTHER PUBLICATIONS

"Antialiasing with Lines and Curves", https://msdn.microsoft.com/en-us/library/9t6sa8s9(v=vs.110).aspx, Retrieved Date: Sep. 21, 2016, pp. 2.

*Primary Examiner* — Samantha (Yuehan) Wang
(74) *Attorney, Agent, or Firm* — Arent Fox LLP

(57) ABSTRACT

Techniques are disclosed for producing an anti-aliasing effect in the rendering of graphical elements defined based on one or more mathematical functions. In various embodiments an example method may include defining a shape based on one or more functions. A view of the shape is then rendered which includes generating a plurality of fragments corresponding to pixels in a display device through which the view will be displayed. Transparency values are set for fragments corresponding to a boundary of the shape based on the one or more functions defining the shape. The transparency values set for the fragments corresponding to the boundary of the shape result in an anti-aliasing effect when the view of the shape is displayed via the display device.

20 Claims, 16 Drawing Sheets

(56) References Cited

U.S. PATENT DOCUMENTS

| | | |
|---|---|---|
| 2005/0094899 A1 | 5/2005 | Kim et al. |
| 2006/0119599 A1 | 6/2006 | Woodbury |
| 2008/0309676 A1* | 12/2008 | Nehab .................. G06T 9/00 345/582 |
| 2010/0166332 A1 | 7/2010 | Lee et al. |
| 2012/0068913 A1 | 3/2012 | Bar-Zeev et al. |
| 2013/0314431 A1* | 11/2013 | Salvi .................. G09G 5/02 345/589 |
| 2015/0084981 A1 | 3/2015 | Clarberg |
| 2015/0287166 A1 | 10/2015 | Cerny |
| 2015/0287232 A1 | 10/2015 | Cerny |
| 2015/0371433 A1* | 12/2015 | Lecocq .................. G06T 15/60 345/422 |

\* cited by examiner

ANTI-ALIASING OF GRAPHICAL ELEMENTS DEFINED BASED ON FUNCTIONS

This application claims the benefit of U.S. provisional patent application no. 62/486,397, filed on Apr. 17, 2017, which is incorporated herein by reference in its entirety.

BACKGROUND

Computer-generated graphics are typically displayed via devices including an array of pixels arranged in rows and columns. Each pixel includes colored pixel sub-components that together are used to create variations in the luminosity and hue of the pixel. When displaying graphics via this kind of pixelated display, a stair-casing effect can result due to the inherent characteristics of the way in which graphics are generated and inherent characteristics of the display. Because the displayed digital image is made up of an array or grid of pixels, edges of displayed objects in the image may appear jagged or stepped to the user. For example, a smooth edge may appear as a stepped or jagged line due to the sampling resolution of the computer-generated image and/or the fixed pixel resolution of the display. This effect is generally referred to as aliasing.

SUMMARY

The technique introduced here includes methods and systems for producing an anti-aliasing effect in the rendering of shapes defined based on one or more mathematical functions. In various embodiments a graphical element may represent a composite of one or more basic geometric shapes defined using mathematical functions. For example, a rectangle with rounded corners may be composite of a rectangle and one or more circles forming the rounded corners. When rendering an image of a shape, transparency values can be determined for fragments corresponding to a boundary of the shape based on the functions defining the shape. The transparency values set for the fragments corresponding to the boundary of the shape result in an anti-aliasing effect when the rendered image of the shape is displayed via the display device.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Overview

A number of techniques have been developed to counter the effects of aliasing in the rendering and display of computer graphics. Such techniques are generally referred to as "anti-aliasing." Anti-aliasing techniques can include applying texture maps that include transparency at boundaries to 'soften' rendered edges. However, such techniques take up significant space in memory and generally result in blurry images, especially when viewing textured objects at certain angles and distances. Another option for anti-aliasing includes increasing the sampling rate when rendering. In some cases, increasing the sampling rate when rendering involves rendering an image at a higher resolution and then down sampling to a display resolution. Examples of this technique include super sampling anti-aliasing (SSAA), full scene anti-aliasing (FSAA), multi-sampling anti-aliasing (MSAA), and coverage sampling anti-aliasing (CSAA). Another option for anti-aliasing includes using multiple passes to apply post-rendering blurring to images. Increasing the sampling rate and/or applying multiple rendering passes can produce effective results in certain situations, but is computationally intensive and not practical in certain devices with limited computing resources.

Accordingly, anti-aliasing techniques are introduced herein that address the above mentioned problems. Specifically, various embodiments are introduced that include defining two-dimensional (2D) shapes based at least in part on mathematical functions and logical operations. When rendering views of the shapes, fragments are generated that may correspond to pixels in a display screen through which the rendered view is to be displayed. In some embodiments, generated fragments corresponding to a boundary of the defined shape in the rendered view may include transparency values (also referred to as "alpha values") based at least in part on the functions and/or logic operations defining the shape. For example, in some embodiments, the transparency values set for generated fragments corresponding to the boundary of a defined shape are based on calculated partial derivatives of the one or more functions defining the shape.

Figure 1:
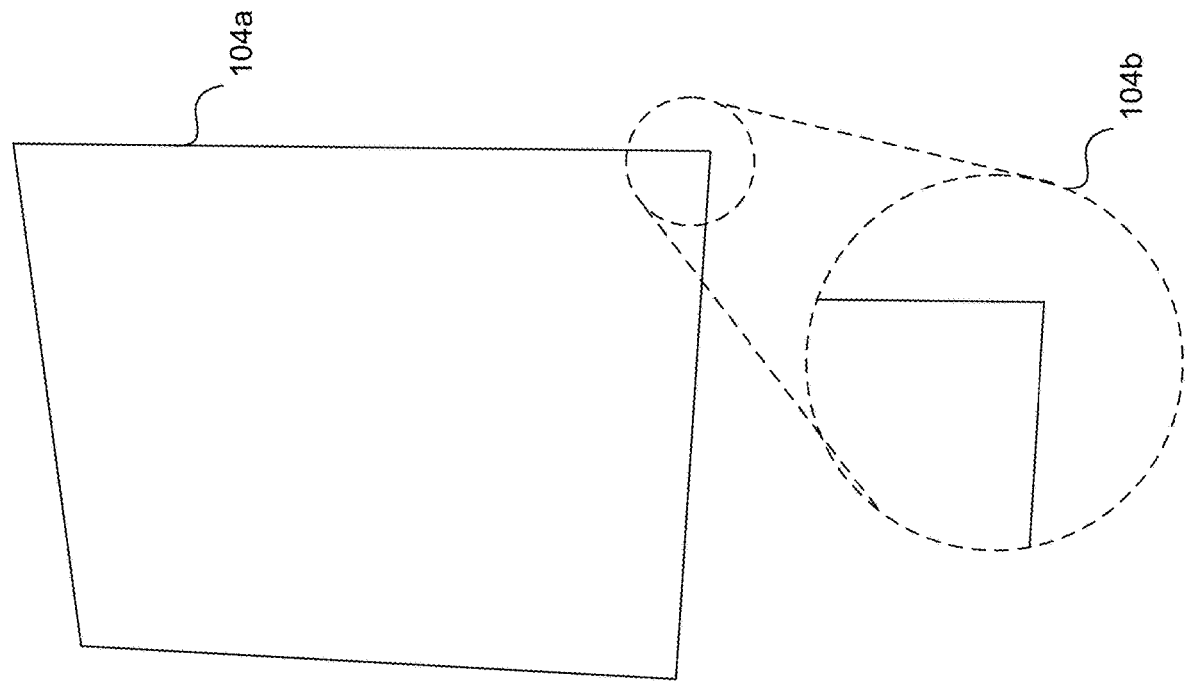
FIG. 1 shows an example display of a shape with and without anti-aliasing applied.
Figure 1:
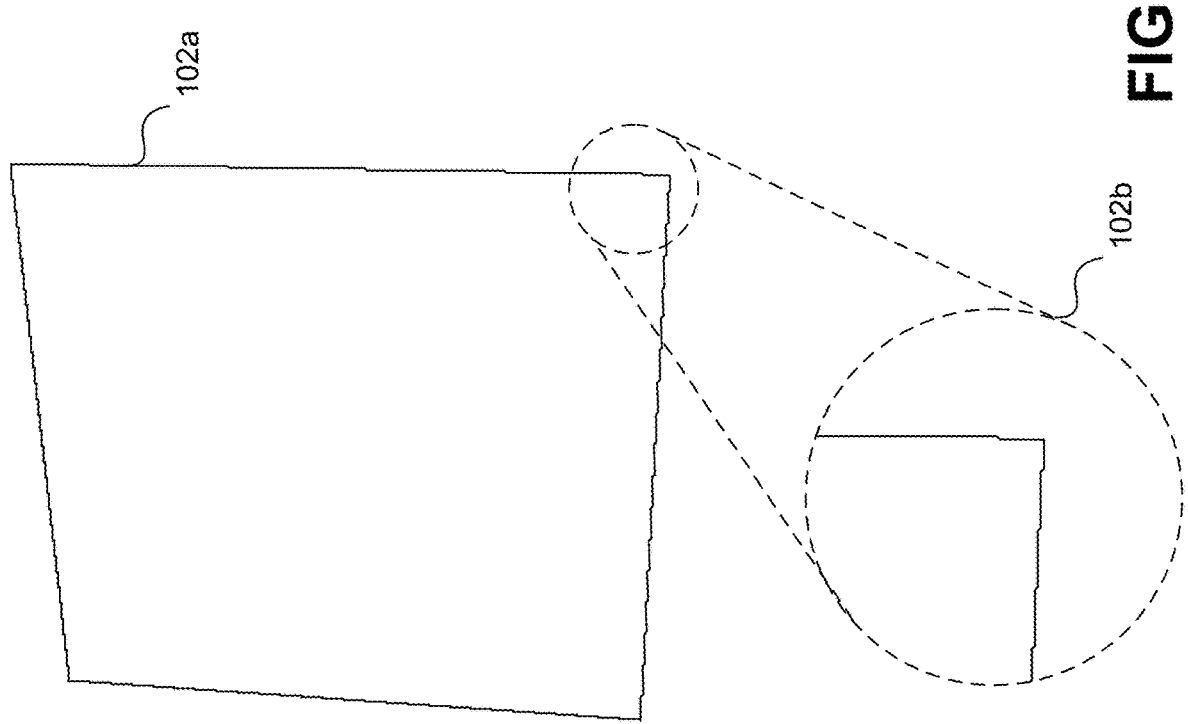

The above described technique can allow for the rendering and display of graphics with sharp anti-aliased edges that remain sharp at any distance or angle. For example, FIG. 1 shows an example display of a simple rectangular shape viewed at an angle. As shown in FIG. 1, rendering without anti-aliasing results in a view 102a that, as shown in detail 102b, includes noticeable aliasing in the form of jagged or stepped edges. Conversely, application of the introduced techniques for anti-aliasing can result in a view 104a of the same rectangular shape that, as shown in detail 104b, has smooth yet sharp edges.

Shapes defined and rendered according to the techniques introduced in this disclosure can be used in any type application that includes the graphical output of computer generated images. For example, in some embodiments, shapes defined and rendered according to the disclosed techniques may form interactive graphical elements in a graphical user interface (GUI).

Example Operating Environment

Figure 2:
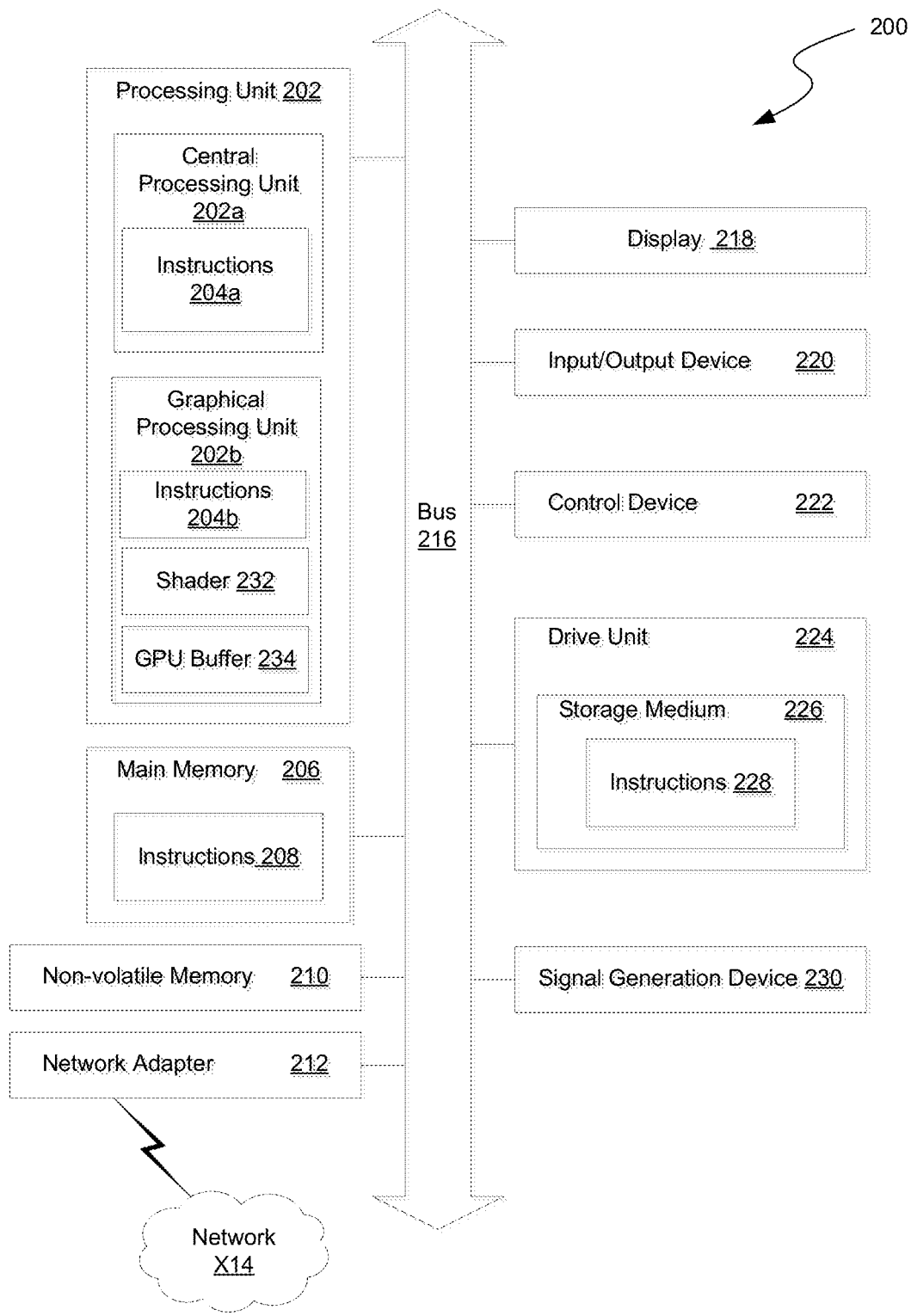
FIG. 2 is a block diagram illustrating an example operating environment in the form of a computer system in which techniques described herein may be performed.

FIG. 2 is a block diagram illustrating an example operating environment in the form of a computer system 200 in which at least some of the techniques described herein can be implemented. The computer system 200 may include one or more processing units ("processors") 202, main memory 206, non-volatile memory 210, a network adapter 212 (e.g., a network interface), display 218, input/output devices 220, control device 222 (e.g., keyboard, touch interface, pointing device, etc.), a drive unit 224 including a storage medium 226, and a signal generation device 230, all of which may be communicatively connected to a bus 216. The bus 216 is illustrated as an abstraction that represents any one or more separate physical buses, point to point connections, or both connected by appropriate bridges, adapters, or controllers. The bus 216, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the computer system 200 operates as a standalone device, although the computer system 200 may be connected (e.g., wired or wirelessly) to other machines. For example, in some embodiments the computer system 200 may be a computing device with an integrated display and control device such as a smart phone, tablet, etc. In other embodiments the computer system 200 may be a remote server device communicatively coupled to a separate display, for example, via a network 214.

As alluded to above the example computer system 200 may take different forms in different embodiments. For example, the computer system 200 may be a server computer, a client computer, a personal computer (PC) (e.g. a laptop or desktop computer), a mobile smart phone, a tablet computer, a wearable computer (e.g., a head-mounted display device), a gaming console, or any machine capable of executing a set of instructions (sequential or otherwise) that specify actions to be taken by a computer system.

While the main memory 206, non-volatile memory 210, and storage medium 226 (sometimes individually or collectively referred to as "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 228. The term "machine-readable medium" and "storage medium" shall also be taken to include any medium that is capable of storing, encoding, or carrying a set of instructions for execution by the computing system and that cause the computing system to perform any one or more of the techniques of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 204a-b, 208, 228) set at various times in various memory and storage devices in a computer, and that, when read and executed by one or more processing units or processors 202, cause the computer system 200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 210, floppy and other removable disks, hard disk drives, optical disks (e.g., Compact Disk Read-Only Memory (CD ROM), Digital Versatile Disks (DVDs)), and transmission type media such as digital and analog communication links.

The network adapter 212 enables the computer system 200 to mediate data in a network 214 with an entity that is external to the computer system 200, through any known and/or convenient communications protocol supported by the computer system 200 and the external entity. The network adapter 212 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

The display 218 may be any type of device configured to produce a visual (and in some cases visual-tactile) output based on received signals. In some embodiments the display 218 may include an array of pixels, each pixel representing an addressable display point through which light is output and combined to form a displayed image. Pixels may include multiple sub-elements, for example, each configured to output light of a particular color. For example, in an RGB color model, each display pixel will include three light emitting elements (e.g., LEDs), each lighting element configured to output light of a particular component color (e.g., red, green, or blue) at varying intensities. Examples of displays include cathode ray tube (CRT) displays, light-emitting diode (LED) displays, organic light emitting diode (OLED) displays, active matrix organic light emitting diode (AMOLED) displays, liquid crystal (LCD) displays, plasma displays, etc.

In some embodiments the display 218 is integrated with a control device 212, for example as part of a capacitive or resistive touch screen display device.

In some embodiments, the display 218 may be part of a wearable head-mounted display (HMD) device, for example for use in virtual reality and/or augmented reality applications. For example, an HMD may include one or more transparent waveguides arranged so that they are positioned to be located directly in front of each eye of the user when the HMD device is worn by the user, to project light representing generated images into the eye of the user. With such a configuration, images generated by the HMD device can be overlaid on the user's view of the real world. Such a configuration is in some cases referred to as a "near-eye display (NED) device."

In an embodiment, an NED device includes a display module that houses components such as: one or more light sources (e.g., one or more light emitting diodes (LEDs)); one or more microdisplay imagers, such as liquid crystal on silicon (LCOS), liquid crystal display (LCD), digital micro-mirror device (DMD); and one or more lenses, beam splitters and/or waveguides. Displayed images in the form of light rays emitted from the display module may be optically in-coupled (i.e., input) into a waveguide comprising a substrate made of a light transmissive material (e.g., glass). The in-coupled light rays are then propagated along the waveguide through total internal reflection (TIR) to a point at which they are out-coupled (i.e., output) from the substrate and directed towards an eye of the user. The in-coupling and out-coupling of light rays to and from the substrate may be accomplished through the use of diffractive optical elements (DOEs), for example, in the form of surface relief gratings (SRGs) arranged on or proximate to a surface of the substrate. As mentioned, the resulting effect of the output light rays, may be the display of generated images that, from the point of view of the user, overlay the user's view of the surrounding real world.

As shown in FIG. 2, in some embodiments, the processing unit 202 may include a central processing unit (CPU) 202a and a graphics processing unit (GPU) 202b. Note that the CPU 202a and GPU 202b are show in FIG. 2 as discrete components for illustrative purposes. However, in some embodiments, one or more aspects of the described CPU 202a and GPU 202b may be integrated into a single processing unit 202.

Components of the computer system 200 may be used in graphics processing, for example including shader computations. For example, the computer system 200 may be used to a graphics pipeline that processes one or more shaders for rendering a graphics element such as a primitive object. A graphics processing pipeline may include a series of operations, which may be specified by shaders that are performed on a digital image. These pipelines are generally designed to allow efficient processing of digital image graphics, while taking advantage of available hardware.

In general a GPU 202b is a processing unit that facilitates graphics rendering. GPU 202b can be used to process vast amount of data-parallel computations efficiently. The GPU 202b can be used to render any visual output including images, glyphs, animations and/or video for display via a display device 218. In some embodiments a GPU 202b can be located, for example, on plug-in cards, in a chipset on the motherboard, or in the same chip as the CPU 202a. In an embodiment, a GPU 202b (e.g., on a video card) can include hardware memory or access hardware memory. In some implementations, a memory unit(s) that functions as both system memory (e.g., used by the CPU 202a) and video memory (e.g., used by the GPU 202b) can be employed. In other implementations, a memory unit that functions as system memory (e.g., used by the CPU 202a) is separate from a memory unit that functions as video memory (e.g., used by the GPU 202b). As can be appreciated, in some embodiments, the functionality of the GPU 202b may be emulated in software, for example executed by the CPU 202a.

To implement a graphics pipeline, one or more shaders 232 may be utilized. Shaders 232 are shown in FIG. 2 as being part of GPU 202b for illustrative purposes, however a person having ordinary skill will recognize that shaders 232 may reside elsewhere in the computer system 200 and be accessed by the GPU 202b. in the illustrated embodiment, shaders 232 may be considered as specialized processing subunits and/or programs of the GPU 202b for performing specialized operations on graphics data. In this context, the shader 232 may be a module including a combination of computer processing hardware and/or software. Further, although illustrated as a separate component in FIG. 2, in some embodiments, aspect so the shader 232 may include or be a part of any of instructions 204a-b, 208, and/or 228.

Examples of shaders include vertex shaders, fragment shaders (also called pixel shaders), and geometry shaders. Vertex shaders generally operate on vertices, and can apply computations of positions, colors, and texturing coordinates to individual vertices. For example, a vertex shader may perform either fixed or programmable function computations on streams of vertices specified in the memory of the graphics pipeline. Another example of a shader is a fragment shader. For example the outputs of a vertex shader can be passed to a fragment shader, which in turn generates fragments, the fragments including information corresponding to an individual pixel. Yet another type of shader includes a geometry shader. A geometry shader, which is typically executed after vertex shaders, can be used to generate new graphics primitives, such as points, lines, and triangles, from those primitives that were sent to the beginning of the graphics pipeline.

Operations performed by shaders 232 may use one or more external graphics-specific resources. These resources can include a constant buffer (cbuffer), texture, unordered-access-view (UAV), or sampler (sampler states), for example. Resources may be assigned positions in graphics pipeline memory called "slots" (described below) which are bound prior to execution by the GPU 202b, and are typically bound at compilation time or development time. However, as described below, embodiments of the present invention assign virtual positions to those resources during compilation. Then, at a later time such as a "link-time," which may occur at runtime, once a structure of the shader is determined, the assigned virtual resource positions are remapped to the appropriate physical or actual positions of the resources.

After a shader 232 concludes its operations, the information may be placed in a GPU buffer 234. The information may be presented on an attached display 218 or may be sent back to the host for further operations.

The GPU buffer 234 provides a storage location on the GPU 202b where information, such as image, application, or other resources information, may be stored. As various processing operations are performed with respect to resources, the resources may be accessed from the GPU buffer 234, altered, and then re-stored on the buffer 234. The GPU buffer 234 allows the resources being processed to remain on the GPU 202b while it is transformed by a graphics or compute pipeline. As it is time-consuming to transfer resources from the GPU 202b to the memory 206, it may be preferable for resources to remain on the GPU buffer 234 until processing operations are completed.

GPU buffer 234 also provides a location on the GPU 202b where graphics specific resources may be positioned. For example, a resource may be specified as having a certain-sized block of memory with a particular format (such as pixel format) and having specific parameters. In order for a shader 232 to use the resource, it may bound to a "slot" in the graphics pipeline. By way of analogy and not limitation, a slot may be considered like a handle for accessing a particular resource in memory. Thus, memory from the slot can be accessed by specifying a slot number and a location within that resource. A given shader 232 may be able to access only a limited number of slots (e.g., 16).

Figure 3:
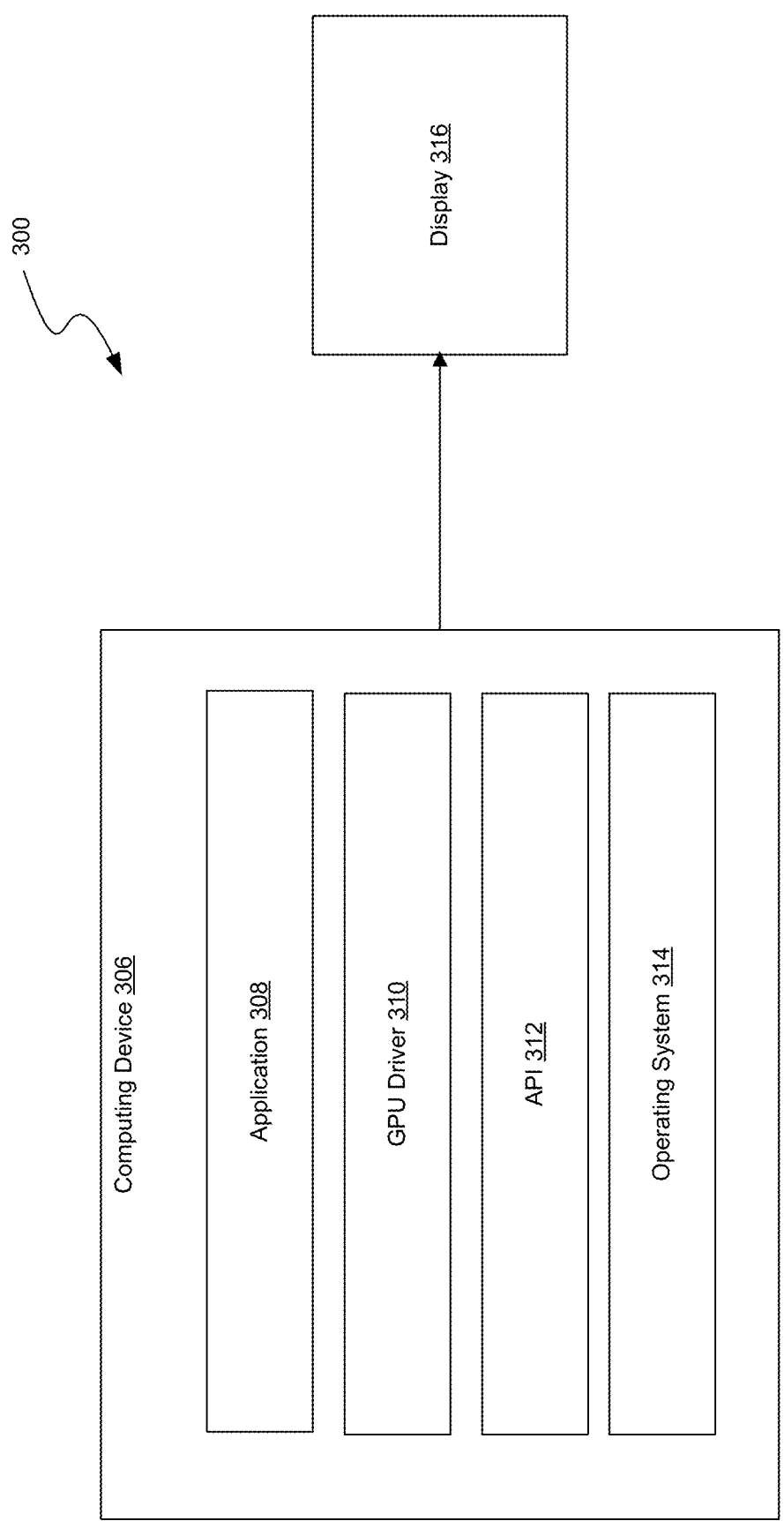
FIG. 3 is a block diagram illustrating an example computing architecture in which techniques described herein may be performed.

FIG. 3 is a block diagram illustrating an example computing architecture 300 that may be suitable for implementing the techniques of the present disclosure. The example computing architecture 300 shown in FIG. 3 is merely an example of one suitable architecture and does not limit the scope of use or functionality of the present innovations. Neither should the computing system architecture 300 be interpreted as having any dependency or requirement related to any single module/component or combination of modules/components. Further, the example architecture 300 is not necessarily separate from the example computer system 200 described with respect to FIG. 2.

In the illustrated embodiment, computing architecture 300 includes a computing device 306 and a display 316. Computing device 306 includes an application 308, a GPU driver 310, API module 312 and operating system 314. Computing device 306 may be any type of computing device, such as, for example, the computer system 100 described above with reference to FIG. 2.

Some embodiments of the exemplary computing architecture 300 include an application 308. In some embodiments, application 308 transmits data for an image or scene to be rendered. Application 308 may be a computer program for which images or scenes are to be rendered, or may be a computer program for which data parallel operations are to be performed. The images to be rendered or scenarios to be computed may include, but are not limited to, video game images, video clips, movie images, static screen images, and other data manipulation. The images may be three-dimensional (3D) or 2D, and the data may be completely application specific in nature. Application programming interface (API) module 312 is an interface that may be provided by operating system 314, to support requests made by computer programs, such as application 308 to perform a render processes, for example, through the use of a GPU driver 310. DirectX®, DirectCompute®, OpenGL®, and OpenCL® are examples of APIs that may support requests by an application 308.

Computing device 306 is shown in FIG. 3 as being in communication with display 316. The display 316 may be any type of device configured to produce a visual (and in some cases visual-tactile) output based on received signal, such as, for example, the display 218 described above with reference to FIG. 2.

Example Graphics Pipeline

Figure 4:
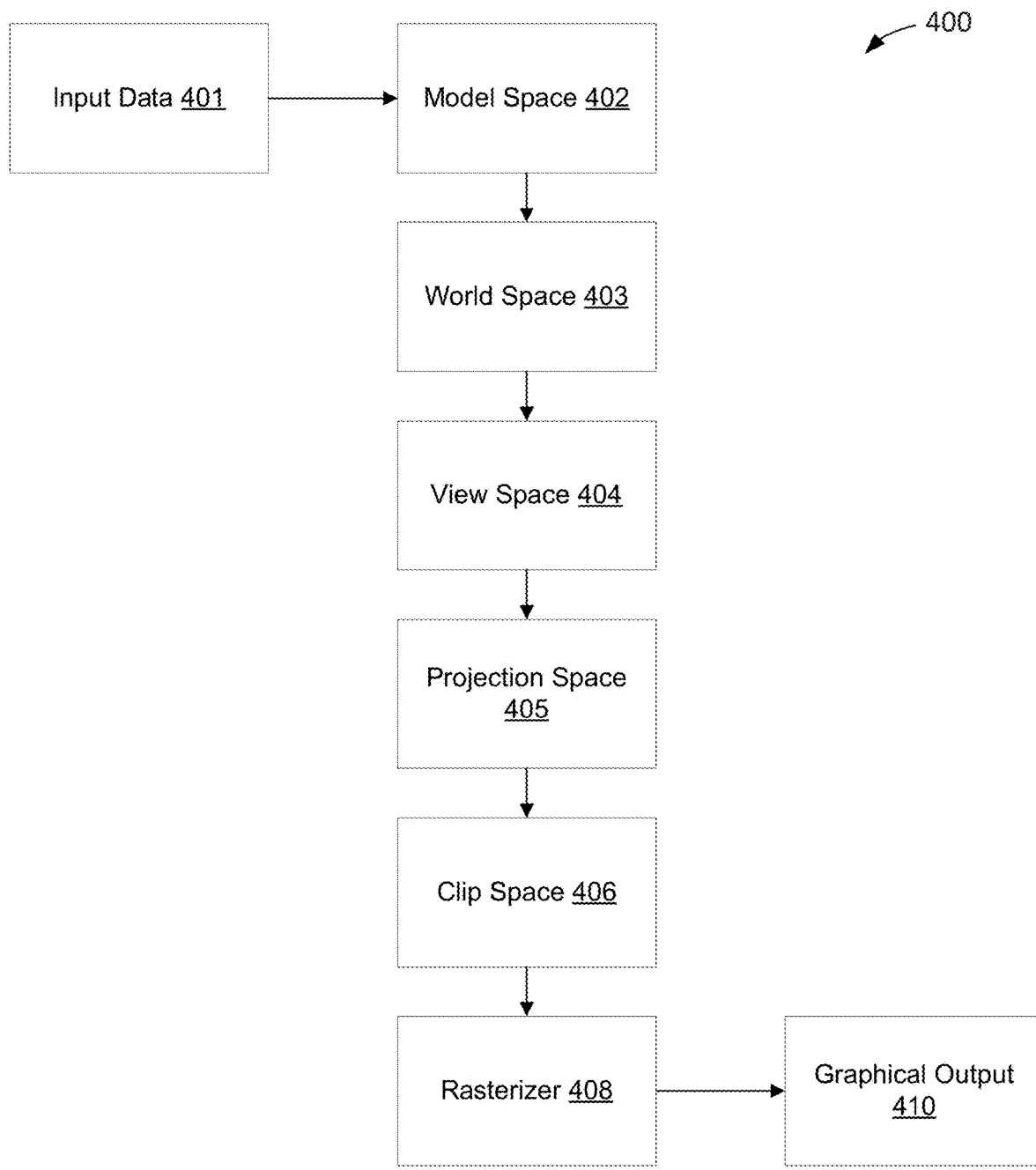
FIG. 4 is flow diagram describing an example graphics pipeline.

FIG. 4 depicts a block diagram of an example embodiment of a graphics pipeline 400, for example, for rendering images of graphical objects existing in a 3D world space. The graphics pipeline 400 may be used to, for example, render an image of the object for display, via a display device (e.g., display 218), to a user. In some embodiments, the graphics pipeline 400 may be used to determine the fragments to be used for shading a pixel that may be displayed via the display. The graphics pipeline 400 may be mapped onto any combination of graphics hardware and/or software, for example, the GPU 202b described above with respect to FIG. 2.

The graphics pipeline 400 may include hardware components such as servers, controllers, databases, processors, storage drives, registers, cache, RAM memory chips, data buses, or the like and/or software components such as graphics rendering applications (e.g., including rendering engines, libraries, shader programs, etc.).

According to one embodiment, the graphics pipeline 300 may convert a 3D model or scene received from a processor into the 2D output that may be displayed via a display device. For example, the graphics pipeline 400 may receive input data 401 including, for example, a graphical model. The input data 401 may include primitive objects, which may include mathematical polygons such as triangles, quadrilaterals, or the like that may be modeled in a modeled scene such as a model space 402. Primitive objects may include or be defined by a multiple vertices representative of the corners of the primitive object and multiple edges representative of the sides of the primitive object. For example, a primitive object in the form of a quadrilateral (or "quad") would include at least four vertices and at least four edges connecting the four vertices. In some embodiments, the quad may be split into two triangles by a bisecting edge connecting opposing vertices.

In an example embodiment, a coordinate system may be established such that primitives may be properly situated in the 3D model space 402. The model space 402 may be converted into a 3D world space 403, a view space 404, and a projection space 405. It may be converted in discrete individual stages, a single stage resulting from a concatenation of matrix transforms, or any combination thereof.

The graphical pipeline 400 may clip and process primitives expressed in projection space from transformation 405 after the primitives have been transformed from view space, and after primitives in projection space are transformed to clip space 406. The graphical pipeline 400 may provide the clipped and processed contents of the 3D scene from the clipping unit into the rasterizer 408. According to one embodiment, the transformed projected view may be established by, for example, placing a virtual "camera" in the 3D world space 403. In one embodiment, the virtual camera may be positioned based on a location of, for example, a user that may view the 2D output via a display device. Based on the positioning of the virtual camera, a coordinate system may be established for view and projection space The graphical pipeline 400 may further rasterize the clipped scene. For example, the graphical pipeline 400 may include a rasterizer 408. According to an example embodiment, the rasterizer 408 may render primitives associated with the clipped data from clip space 406 into fragments that may form a graphical image 410 that is then output via a display. For example, the clipped data from clip space 406 may be divided into a two dimensional array of pixels. The rasterizer 408 may then render the primitives into pixel areas that may form a graphical image 410. In some embodiments, the generation of the fragments may be performed by a fragment shader that is part of or operating in conjunction with the rasterizer 408. The rendered image of the primitive may then be output as a graphical image 410 to a display device such as the display 218 described above with respect to FIG. 2. In some embodiments, the rasterizer 408 may also provide antialiasing on the scene 306 using the processes described herein during rendering of the graphical image 410.

Anti-Aliasing

Figure 5A:
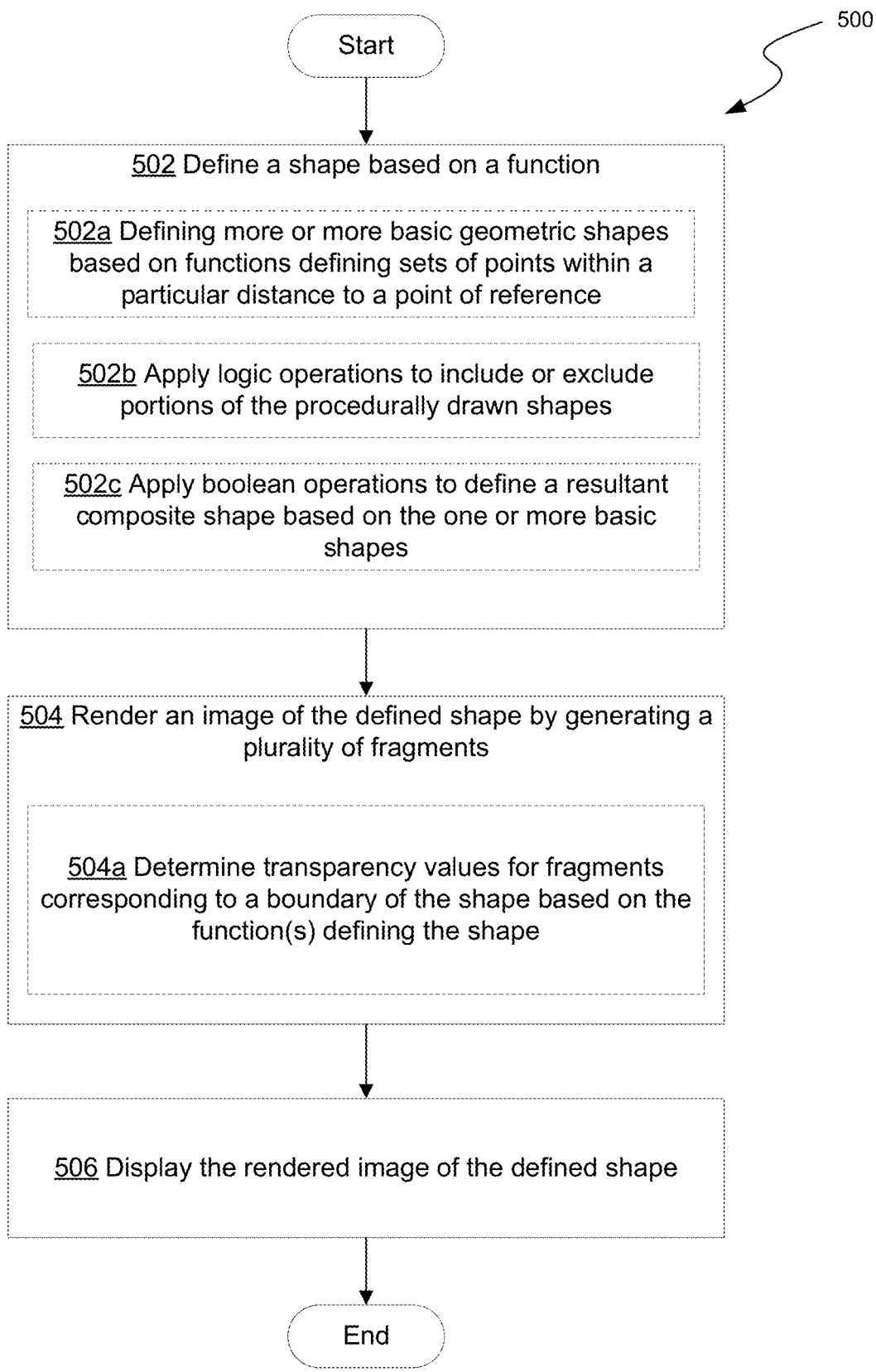
FIG. 5A is flow diagram describing an example process for defining and rendering graphical elements with anti-aliasing.

FIG. 5A shows an example process 500 for generating and rendering graphical elements for display via a display device (e.g., display 218 described with respect to FIG. 2) that utilizes the introduced techniques for anti-aliasing. In some embodiments, one or more of the steps of example process 500 may be performed by one or more components of computer system (e.g., computer system 200 described with respect to FIG. 2). Specifically, in some embodiments, one or more of the steps of process 500 may be performed by a shader module (e.g., shader 232 described with respect to FIG. 2) operating as part of or in conjunction with a graphics engine (e.g., the Unity® graphics engine). Note, that the shader module 232 is illustrated in FIG. 2 as part of a GPU unit 202b, however it shall be appreciated that processes described herein as being executed by a shader module may be executed by any processing unit, including a central processing unit (CPU).

The example process 500 begins at step 502 with defining a shape based on one or more mathematical functions. In other words, with an assumption that a shape represents a closed set of points within a given space, one or more mathematical functions may be used to describe the point set associated with a given shape. With the one or more functions, one can identify points that fall within a boundary of the shape, points that fall along a boundary of the shape, and points that fall outside the boundary of the shape. Note that while the term "boundary" is used in this context, in the case of defining objects relative to points in a 3D space, this "boundary" may also be referred to as an "implicit surface."

Figure 6A:
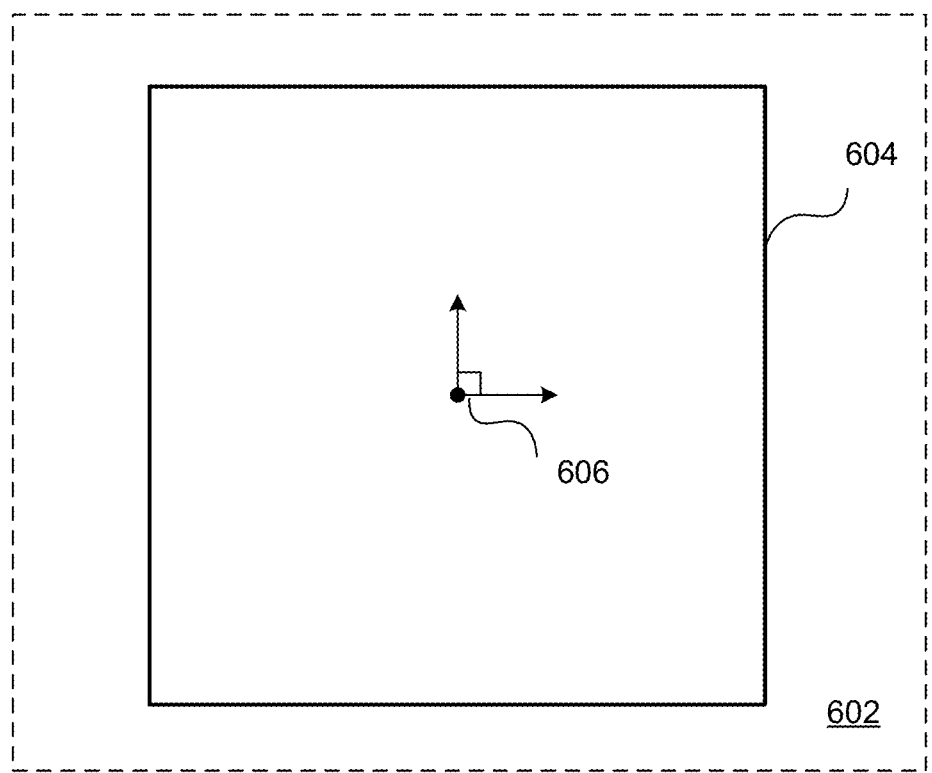
FIG. 6A shows a front view of an example primitive object in the form of a quadrilateral primitive ("quad")
Figure 6B:
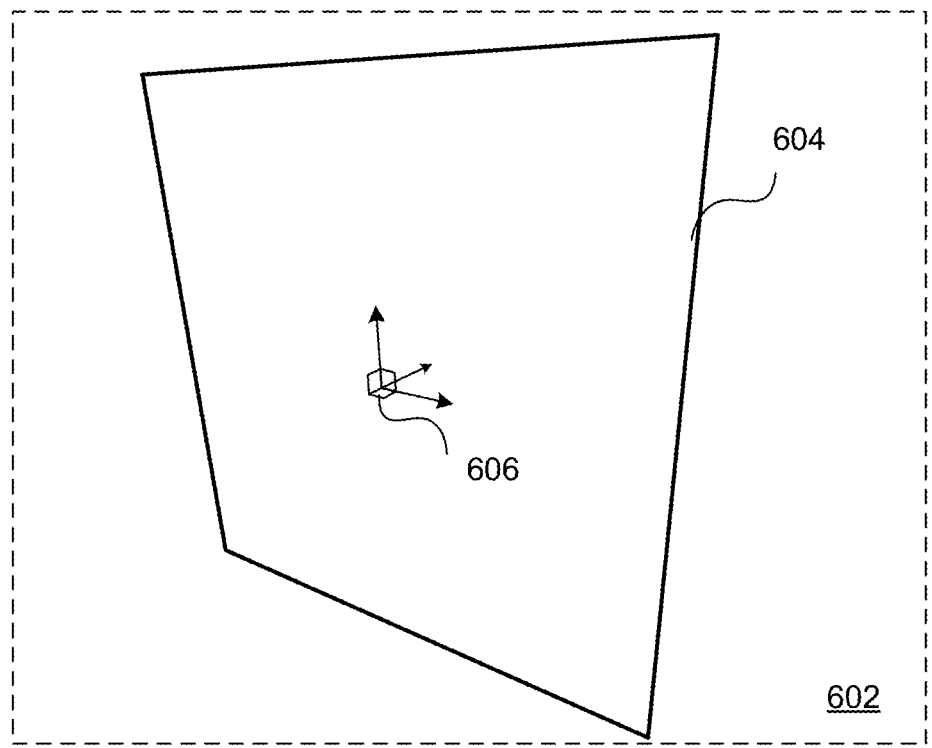
FIG. 6B show a perspective view of the quad of FIG. 6A.

In some embodiments, 2D shapes are defined using one or more functions relative to a primitive object residing in a 3D world space. In other words, the one or more functions may define a shape relative to a point of reference in a local space of the primitive object. As previously described, a primitive object can include polygons such as triangles, quadrilaterals, or the like that may reside in a 3D world space. Primitive objects may include, or be defined by, multiple vertices representative of the corners of the primitive object and multiple edges representative of the sides of the primitive object. For example, a primitive object in the form of a quadrilateral (or "quad") would include at least four vertices and at least four edges connecting the four vertices. FIGS. 6A and 6B show a front view and a perspective view (respectively) of a representation of an example primitive object in the form of a quad mesh 604 residing in a 3D world space 602. As shown, the quad 604 may include vertices at each corner and edges connecting the vertices. The vertices of the quad may be defined relative to a local point of reference 606. For clarity, the techniques introduced herein are described in the context of a single quad mesh, however a person having ordinary skill will recognize that the described techniques may similarly be applied to more complex meshes of polygons including those associated with 3D shapes such as cubes, spheres, cylinders, etc.

As previously mentioned, in some embodiments, the process of rendering an image of a primitive object may include an initial vertex shading process followed by a fragment shading process. Vertex shaders generally operate on vertices, and can apply computations of positions, colors, and texturing coordinates to individual vertices. For example, a vertex shader may perform either fixed or programmable function computations on streams of vertices specified in the memory of the graphics pipeline. Another example of a shader is a fragment shader. For example the outputs of a vertex shader can be passed to a fragment shader, which in turn generates fragments, the fragments including information corresponding to an individual pixel.

Figure 7A:
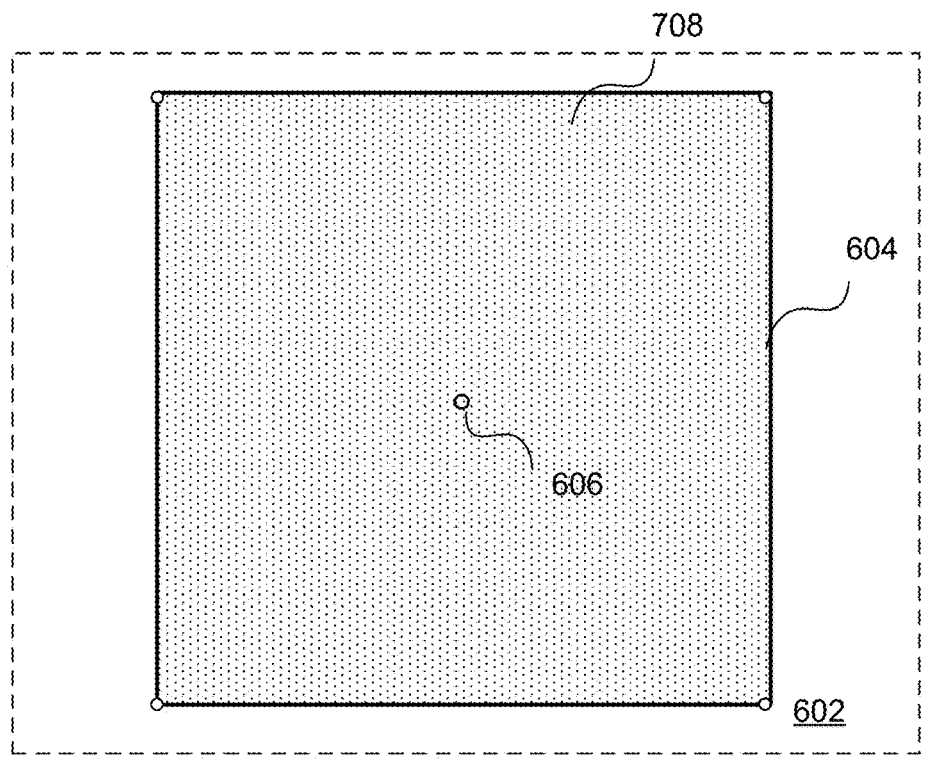
FIG. 7A shows a front view of an example rectangular shape defined relative to the quad of FIG. 6A.

The fragment shader process may run at least once for each corresponding pixel to be displayed. Specifically, fragment may include information such as an associated pixel location, a depth value, and a set of interpolated values such as a color (e.g., including R, G, and B component values), a transparency value (also referred to as an alpha value), and in some cases texture coordinates (where a texture is applied). For example, FIGS. 7A and a 7B show a front view and a perspective view (respectively) of a shape 708 with respect to the primitive object 604 of FIGS. 6A-6B. Here, the shape 708 can be defined as a rectangle extending to the edges of the quad 604. In an embodiment this shape 708 might be represented by function of the x and y distances to a local point of reference (e.g., center point 606). In this example, the distance of a particular fragment i may be expressed in the instructions of the fragment shader as distance=abs(i.uv.zw) wherein 'abs( )" is an absolute value function applied to the uv coordinate. At runtime, the fragment shader might set color values for fragments falling within the boundary of the defined shape 708. Note that the shape is depicted in FIG. 708 as having relatively uniform color values because a textures and/or other effects (e.g. lighting) have not been applied, however a person having ordinary skill will recognize that all of these factors may be taken into account by the fragment shader depending on the implementation.

Returning to FIG. 5A, in some embodiments, to define shapes that are more complex than a rectangle bounded by the edges of the quad, the step of defining the shape may include. at step 502a, first defining more or more basic geometric shapes (rectangle, circle, etc.) based on functions defining sets of points within a particular distance to a point of reference, for example as previously described. Next at step 502b, logic operations are applied to the one or more functions to include or exclude portions of each one or more basic shapes. In some embodiments, this may also include, at step 502c, applying Boolean logic operations (e.g., union, intersection, difference, etc.) to define a resultant composite shape based on the one or more basic geometric shapes. In both cases the logic operations and Boolean operations may be simulated using arithmetic operations applied to the functions defining the one or more shapes.

Figure 7B:
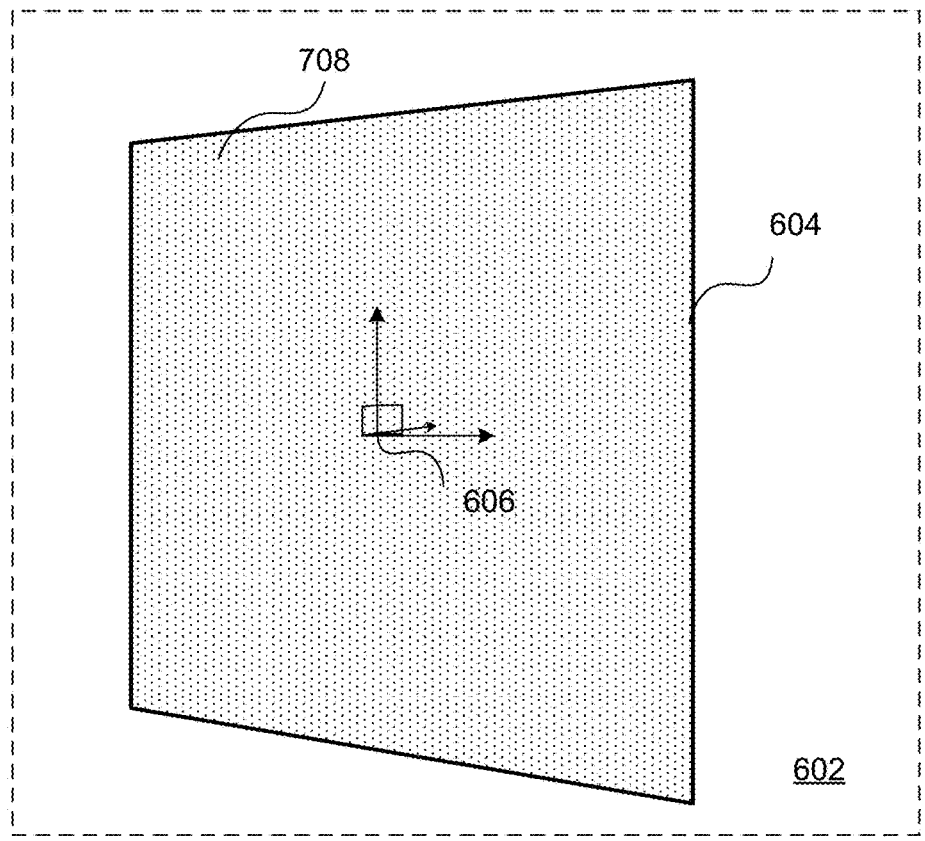
FIG. 7B shows a perspective view of the example rectangular shape of FIG. 7A.
Figure 8A:
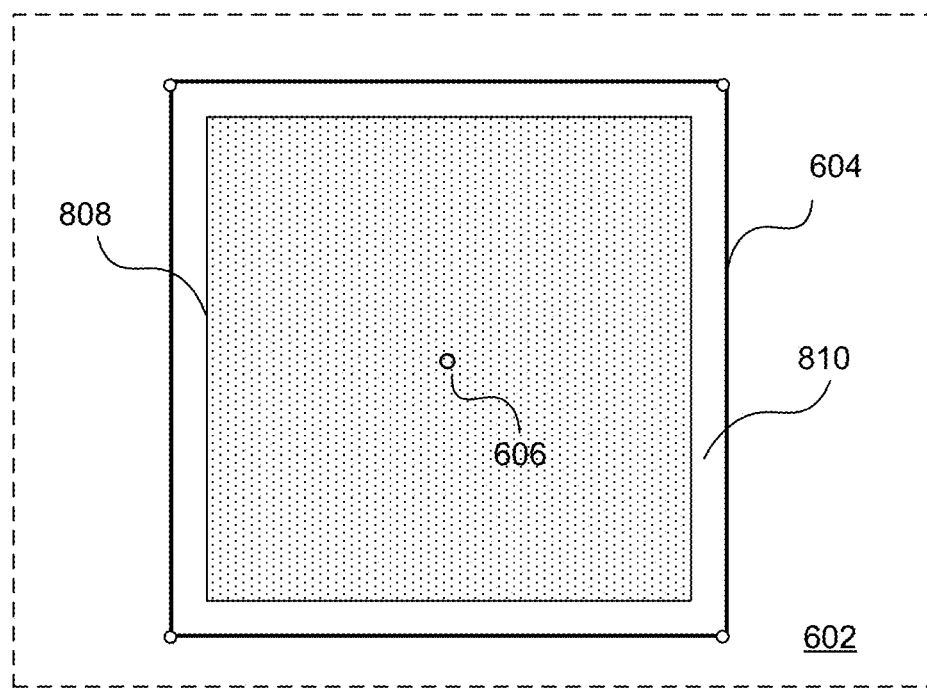
FIG. 8A shows a front view of an example shape with a margin defined relative to the quad of FIG. 6A.
Figure 8B:
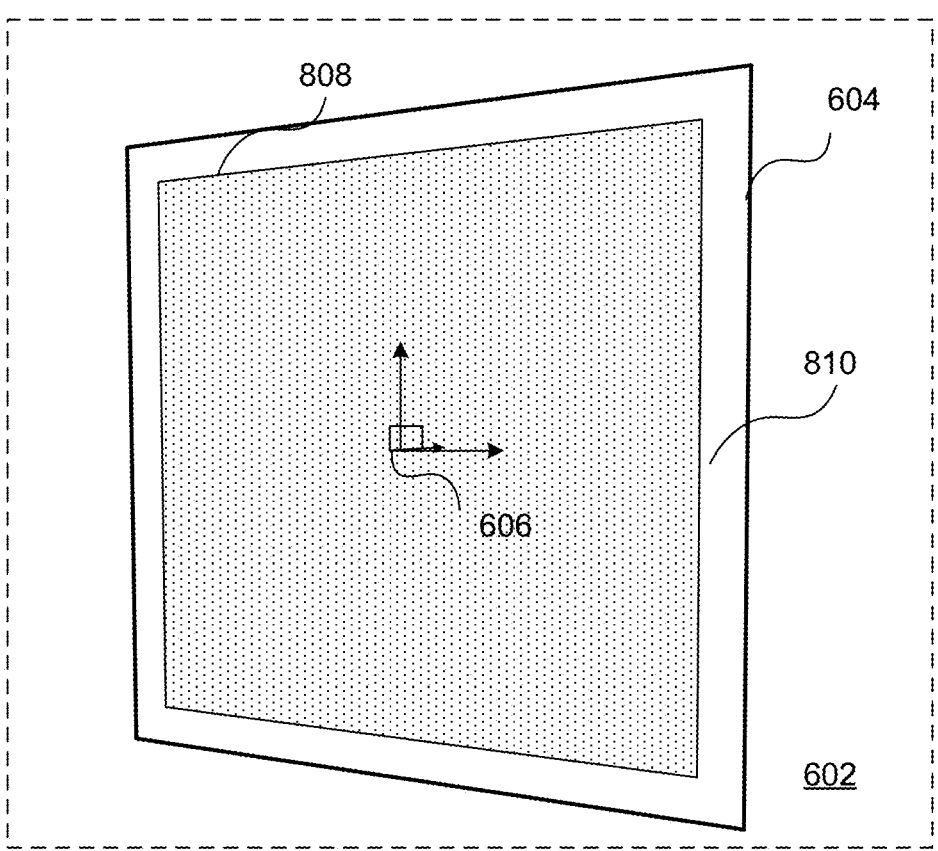
FIG. 8B shows a perspective view of the example shape of FIG. 8A.

FIGS. 8A-8B show a front view and a perspective view (respectively) of an example shape 808 with respect to the primitive object 604 of FIGS. 6A-6B. Note that the shape 808 may be similar to the rectangular shape 708 of FIGS. 7A-7B, except that the "solid" region is reduced so as to include a margin area 810 from an outer boundary of the shape 808 to the boundary of the quad 604. The resulting shape 808 may represent a logical operation applied to the rectangle function defining an original shape (e.g. shape 708) to exclude the margin area 810. In some embodiments this may include defining a transparency mask (or "alpha mask") to result in a display that appears to exclude the margin area 810. As shown in FIGS. 8A-8B, using a process referred to as "alpha compositing," the fragment shader may generate fragments corresponding to the margin area 810 of the quad 604 that include information configured to cause the display of the shape to appear partially or fully transparent. In other words, other objects occupying the same world space as the quad 604 would be visible in the margin area 810 even if they are behind the quad 604 from the point of view of a virtual camera. Further, as will be described in more detail later, in some embodiments, it is through the use of this transparency mask that anti-aliasing can be achieved.

Note that the margin area 810 may be defined based on a user configurable parameter, thereby allowing a user to increase and/or decrease the size of the margin area 810. In some embodiments, values for such a parameter may be adjusted at run time, thereby allowing for run-time changes to the display of shape 808 even without scaling or transforming the primitive object 604. For example, in response to a user input setting a value for a margin parameter, the display of the shape 808 may dynamically change to reflect the desired margin.

Figure 9A:
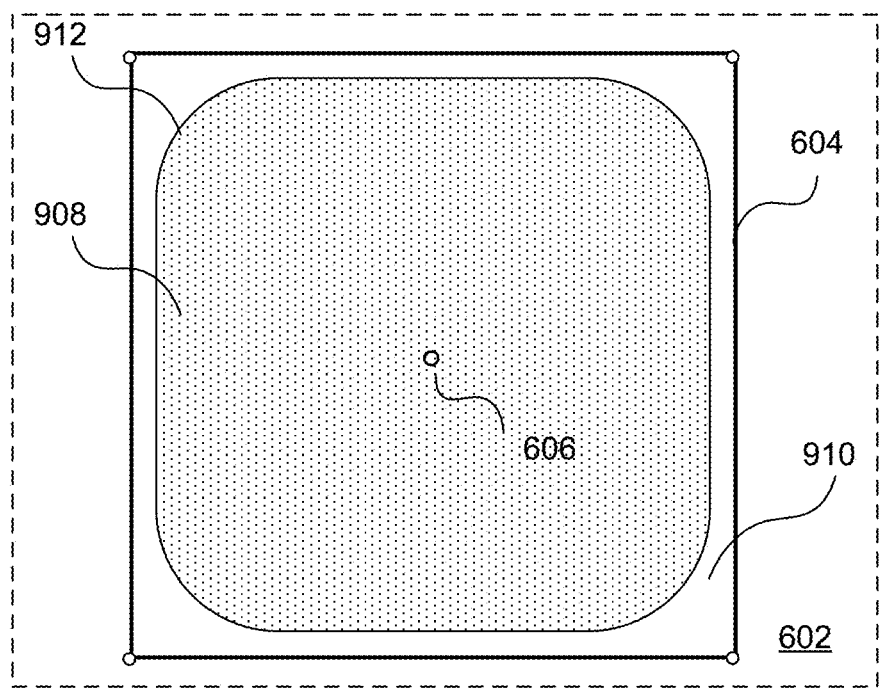
FIG. 9A shows a front view of an example shape with rounded corners defined relative to the quad of FIG. 6A.
Figure 9B:
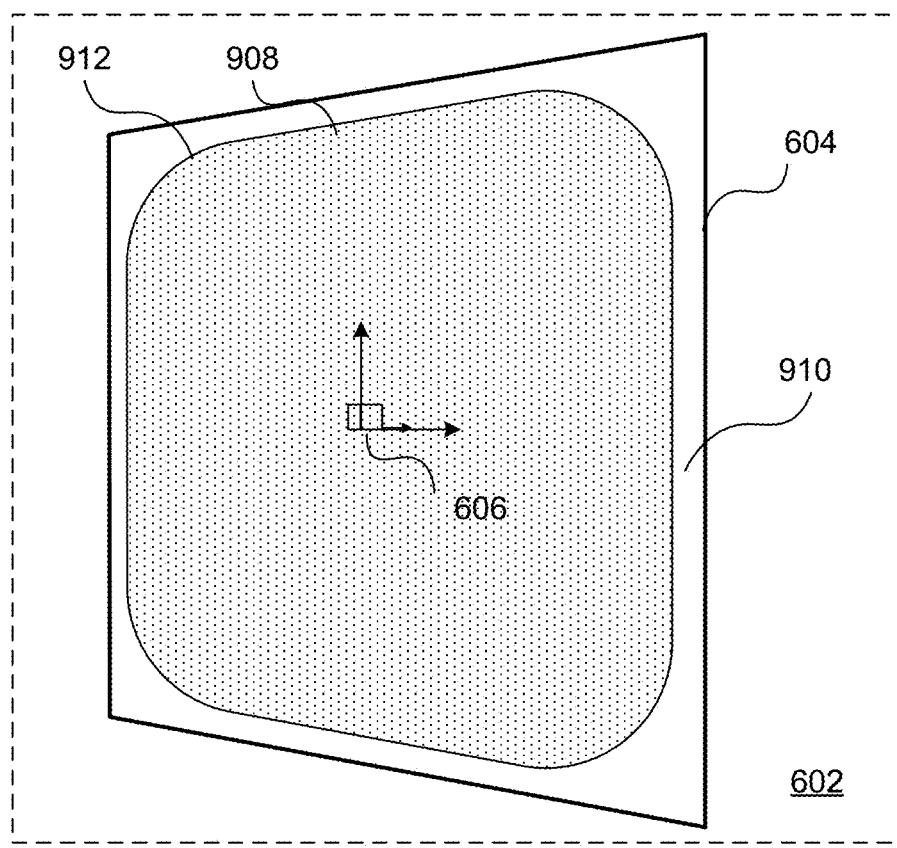
FIG. 9B shows a perspective view of the example shape of FIG. 9A.

Similarly, FIGS. 9A-9B show a front view and a perspective view (respectively) of an example shape 908 with respect to the primitive object 604 of FIGS. 6A-6B. Note that the shape 908 may be similar to the rectangular shape 708 of FIGS. 7A-7B, except that the "solid" region is reduced so as to include a margin area 910 from an outer boundary of the shape 908 to the boundary of the quad 604 as well as rounded corners 912. Similar to shape 808, the resulting shape 908 may represent the result of a logical operation applied to the rectangle function defining an original shape (e.g. shape 708) to exclude the margin area 910. Further, the resulting shape 908 may also represent a composite shape that is the result of Boolean operations, for example, to clip the corners of the shape defined by the rectangle function by other shapes defined, for example, by a circle function. For example, the circle function may define a distance to the center of a circle of a particular radius.

The circle function defining the rounded corners 912 may include one or more user configurable parameters, thereby allowing a user to, for example, increase and/or decrease the radius of the rounded corners. In some embodiments, values for such a parameter may be adjusted at runtime, thereby allowing for runtime changes to the display of shape 908 even without scaling or transforming the primitive object 604. For example, in response to a user input setting a value for a radius parameter, the display of the shape 908 may dynamically change to reflect the desired rounded corners.

In some embodiments, a shape 808 and/or 908 may transition smoothly from a first state to a second state in response to user inputs setting certain parameters. Consider, for example, a user input setting a radius parameter, in some embodiments, a fragment shader may be configured to automatically interpolate intermedia values for the radius parameter when rendering intermediate frames at run time so as to result in the rendering display of a smooth transition from the initial corner radius setting to the desired corner radius setting.

The shapes 808 and 908 of FIGS. 8A-8B and 9A-9B (respectively), have been described for illustrative purposes, but are not to be construed as limiting. A person having ordinary skill will recognize that different resulting shapes may similarly be rendered relative to a primitive object using the techniques described herein.

Returning to FIG. 5A, example process 500 continues at step 504 with rendering a view of the defined shape, for example, by generating a plurality of fragments (as previously described). Further, an anti-aliasing effect is achieved where step 504 includes, at step 504a, setting transparency values for fragments corresponding to a boundary of the shape. Specifically, in some embodiments these transparency values are set based on the one or more functions defining the shape.

In some embodiments, setting the transparency values for fragments corresponding to a boundary of a given shape may include determining which fragments correspond to the boundary. In some embodiments, this includes calculating the partial derivatives for a function defining the shape.

A partial derivative of a given function with multiple variables is generally understood to be the derivative with respect to one of the multiple variables. Consider, for example, a function $f(x, y)$ wherein x and y correspond to the x and y coordinates in a 2D space. The partial derivative of the function $f(x, y)$ with respect to the x (denoted as $\partial f/\partial x$) would describe the rate of change of the function in the x-direction of the 2D space. Similarly, the partial derivative of the function $f(x, y)$ with respect to the y (denoted as $\partial f/\partial y$) would describe the rate of change of the function in the y-direction of the 2D space. Together, the two partial derivatives can be expressed as components in a vector $\nabla f$, also referred to as the gradient of the function.

Returning to our example of the shape based on a rectangle function, in some embodiments, instructions for calculating the partial derivatives at a particular fragment i may be expressed in the shader as delta=fwidth(p), wherein fwidth( ) is a function for calculating the partial derivatives and p is a value computed for the particular fragment i based on the function defining the shape (e.g., abs(i.uv.zw)). Specifically, in this example, fwidth(p)=abs($\partial f/\partial x$(p))+abs($\partial f/\partial y$(p)). In some embodiments, the rate of change (i.e., partial derivatives) of the function may be interpreted as the difference in the returned values p for the function defining the shape (e.g., abs(i.uv.zw)) between two or more adjacent fragments or associated pixels.

Once the partial derivatives are calculated, a region test may be performed based at least in part on the partial derivatives to identify if a particular fragment i resides within the boundary of the shape, resides along the boundary of the shape, or resides outside the boundary of the shape. Note, that due to the inherent nature of sampling to produce fragments, it is expected that some fragments may reside partially along the boundary as well as partially within and/or outside of the boundary. To resolve this issue, a smoothstep function can be applied to interpolate a value between 0 and 1, for example, wherein the smoothstep function returns a value of 0 for fragments that reside completely outside the boundary of the shape, returns a value of 1 for fragments that reside completely inside the boundary of the shape, and returns an interpolated value of between 0 and 1 for fragments that reside at least partially along the boundary, in other words, fragments that correspond to the boundary of the shape. In some embodiments, this interpolation is based at least in part on the calculated partial derivatives for the function. This makes sense because the rate at which the function defining the shape changes in the x and/or y direction can inform the threshold values to apply with the smoothstep function. For example, in some embodiments, an interpolation function may be expressed in the instructions of the shader as: alpha_edge=smoothstep(solid.xy−delta, solid.xy+delta, distance), wherein as one may recall, "delta" represents the partial derivatives of the function defining the shape.

For fragments corresponding with the boundary of the shape, transparency values (i.e., alpha values) can be set based on the partial derivatives of the function defining the shape. In this example the transparency value applied for a given fragment i may in some way be based on the interpolated value between 0 and 1 resulting from the smoothstep function. In other words, for fragments in which smoothstep returns 1 (i.e., indicating that the fragment is fully within the boundary of the shape), the transparency value may be set to one (i.e., that display of a corresponding pixel would indicate an opaque area of the shape). Similarly, for fragments in which smoothstep returns 0 (i.e., indicating that the fragment is fully outside the boundary of the shape), the transparency value may be set to zero (i.e., that display of a corresponding pixel would indicate full transparency). Finally, for fragments in which smoothstep returns an interpolated value between 0 and 1 (i.e., indicating that the fragment corresponds with the boundary of the shape), the transparency value may be set some value between 0 and 1 (i.e., that display of a corresponding pixel would indicate partial transparency). It will be appreciated that the actual transparency values returned may depend on other factors. For example, in some embodiments fragments corresponding to pixels within the boundary of the shape may include transparency values to result in display of a graphical element that appears at least partially transparent to a user when viewed via a display.

Returning to FIG. 5A, at step 506, example process 500 may conclude with displaying a rendered view of the defined shape via a display device. For example, the resulting output for the above process may be a value, "col" for the particular fragment i that is indicative of a color to be output by a corresponding pixel of the display device. Specifically, in some embodiments, the value "col" may include, a red component "col.r," a green component "col.g," a blue component "col.b," and a transparency component "col.a."

Process 500 for defining and rendering shapes with anti-aliasing, as described above, is an example provided for illustrative purposes. In other embodiments, the process may order the steps differently and/or may include fewer or more steps that are described with respect to FIG. 5A. For example, the addition of rounded corners to a rectangular shape is described to illustrate how basic shapes can be composited to create more complex shapes but is otherwise unnecessary to the anti-aliasing technique.

Figure 10:
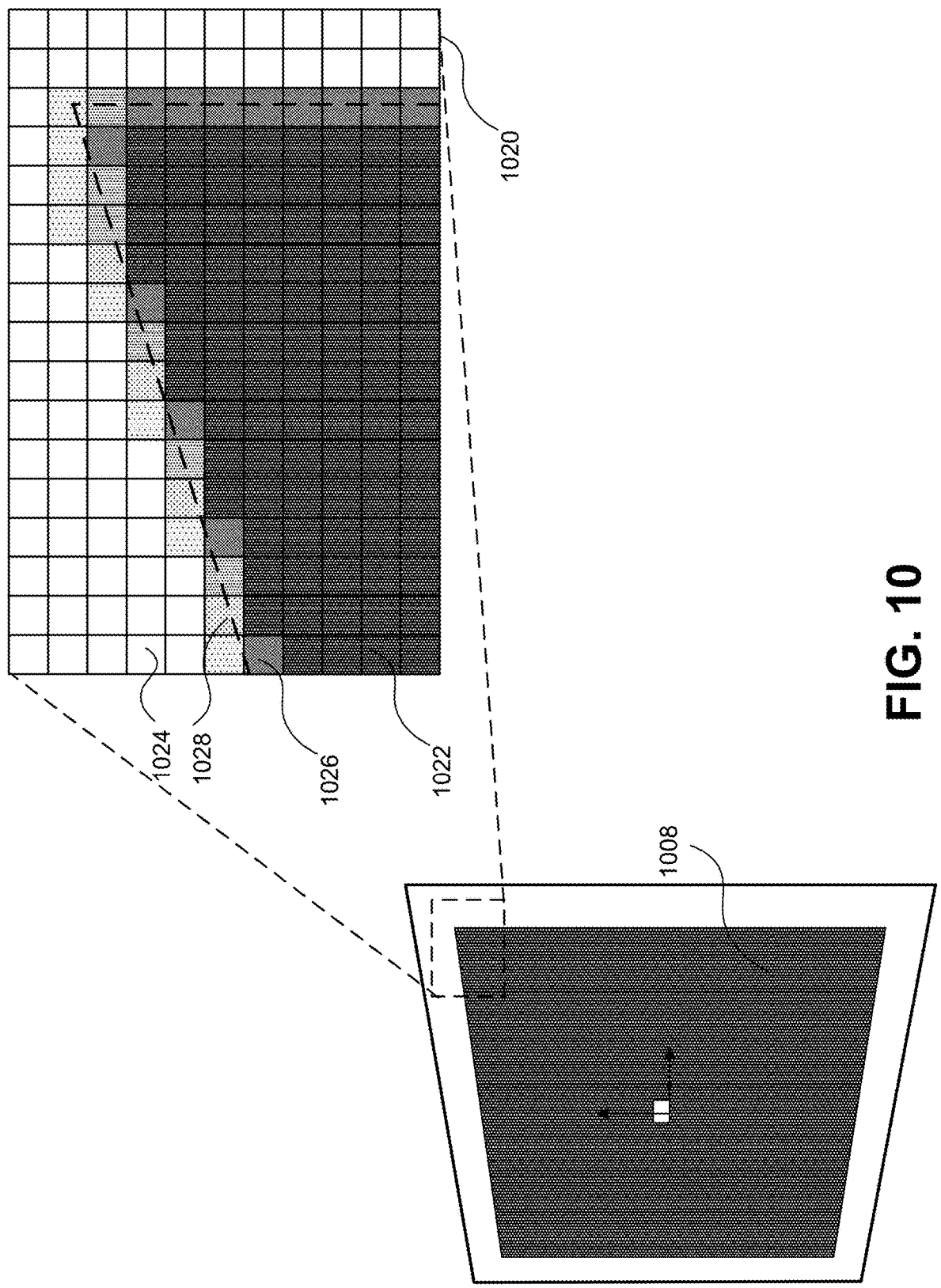
FIG. 10 shows a detail of an example anti-aliasing effect.

FIG. 10 shows a detail 1020 of shape 1008 that illustrates how applying transparency values to fragments corresponding to the boundary of the shape results in an anti-aliasing effect. For example, detail 1020 shows an example grid of rectangular elements arranged in rows and columns. Each of the rectangular elements in detail 1020 may represent a fragment or corresponding pixel of a display device. As shown in detail 1020, each element includes an associated shade that may correspond to color and/or transparency value in practice. In this representative example, fragments 1022 that are completely inside the boundary 1028 (as represented by the dotted line) of shape 1008 are depicted as fully shaded, fragments 1024 that are completely outside of a boundary 1028 of shape 1008 are depicted as unshaded, and fragments 1026 that correspond to the boundary 1028 of the shape 1008 are depicted as partially shaded at some intermediate value between fully shaded and unshaded, wherein the intermediate value is based at least in part on partial derivatives of a function defining the shape 1008. Note that detail 1020 is just an example to illustrate how an anti-aliasing effect can be achieved using the disclosed techniques. The actual manner in which fragments are shaded will differ depending on the implementation.

Further, anti-aliasing using partial derivatives of the one or more functions defining the shape 1008 allows for sharp edges when viewing the shape at any angle or distance and is not as computationally expensive as post processing blurring and/or increasing the sampling rate. Further, the transparency values are calculated at run time alleviating the need to store texture maps with transparent edges in memory.

As previously discussed, in an embodiment, a shader may be configured to render an image of a shape according to the previously described techniques. FIGS. 5B-5E show a series of flow charts describing example processes that may be performed by a shader program executing a set of instructions.

Figure 5B:
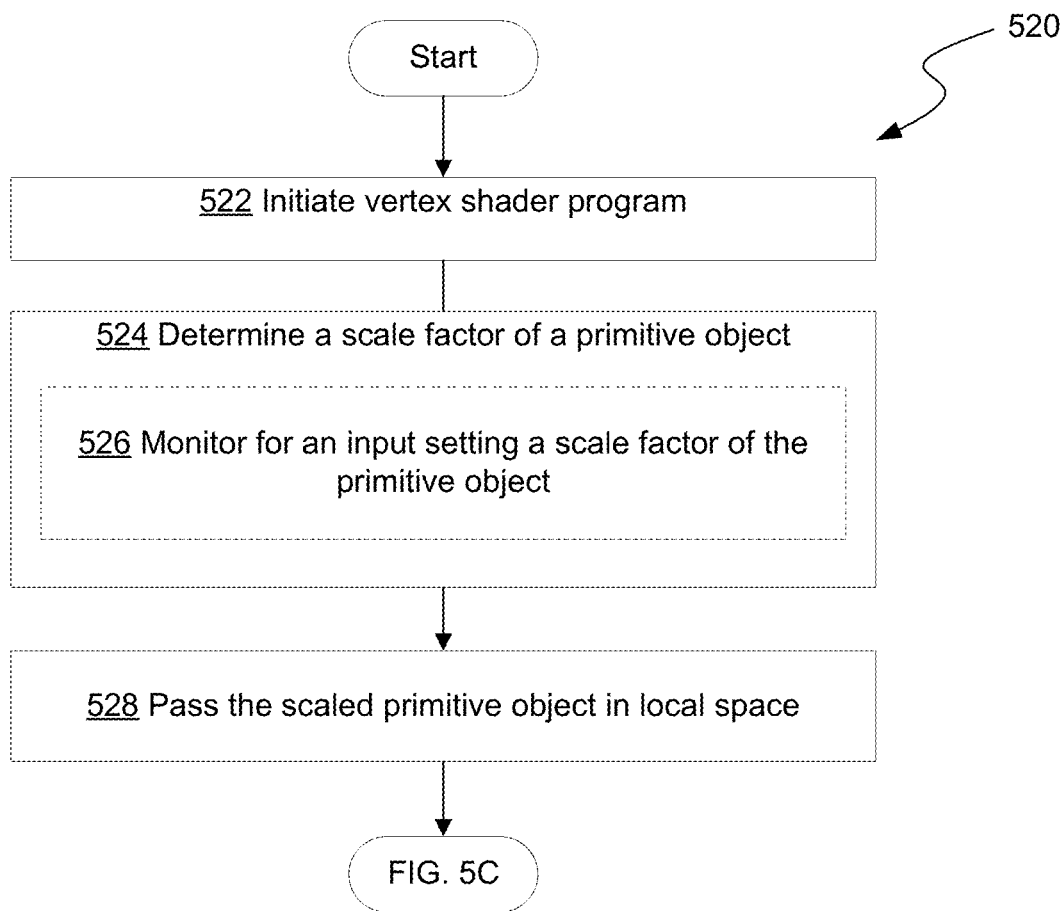
FIG. 5B is a flow diagram describing an example vertex shader process.

FIG. 5B is a flow chart illustrating an example process 520 that may be performed as part of an initial vertex shading process. Process 520 begins at step 522 within initiating the vertex shader program. As previously discussed. The vertex shader program described by example process 520 may be run once for each vertex in a given primitive object to render an image (e.g., a single frame in a frame buffer).

Process 520 continues at step 524 with determining a scale factor of the primitive object (e.g., a quad) being rendered. The scale factor may be based on a number of different factors, but in some embodiments may be set based on input values for one or more variable parameter.

Accordingly, in some embodiments, step 524 may include, at step 526, monitoring for an input setting a scale factor. In some embodiments, this input may be based on a user input. For example, a user may input a particular value to uniformly or non-uniformly scale a graphical element associated with the primitive object. In some embodiments the scale value may be set, for example, by a user interacting with a displayed image of a graphical element associated with the primitive object. For example, a user might click a corner of a displayed rectangle and drag the corner in one or more directions to scale the graphical element. This input may be registered as request to scale the primitive object and passed as an input to the vertex shader program.

Process 520 continues at step 528 with passing a scaled primitive object (i.e., based on the determined scale factor) in local space.

Figure 5C:
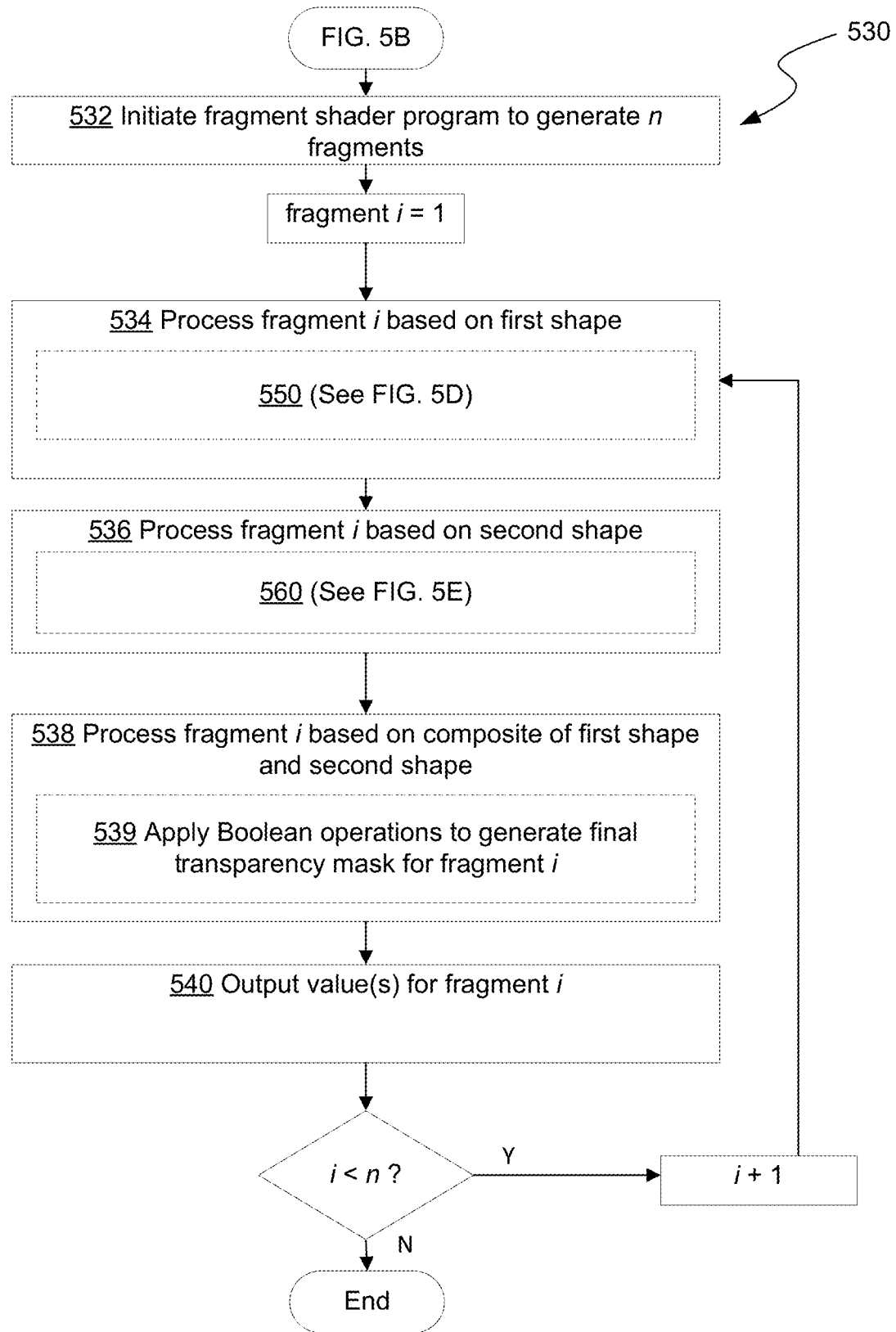
FIG. 5C is a flow diagram describing an example fragment shader process.

Once the process 520 is completed for the one or more vertices of the primitive object, the process continues to step 532 of example process 530 (shown in FIG. 5C) with initiating the fragment shader program to generate fragments that will be used to display the rendered image. As mentioned, in some embodiments, each generated fragment may correspond to a particular pixel in a display device through which the image will be displayed. As indicated in FIG. 5C, the example process 530 of the fragment shader program may be run once for each fragment i of a total number of fragments n associated with a rendered image.

Figure 5D:
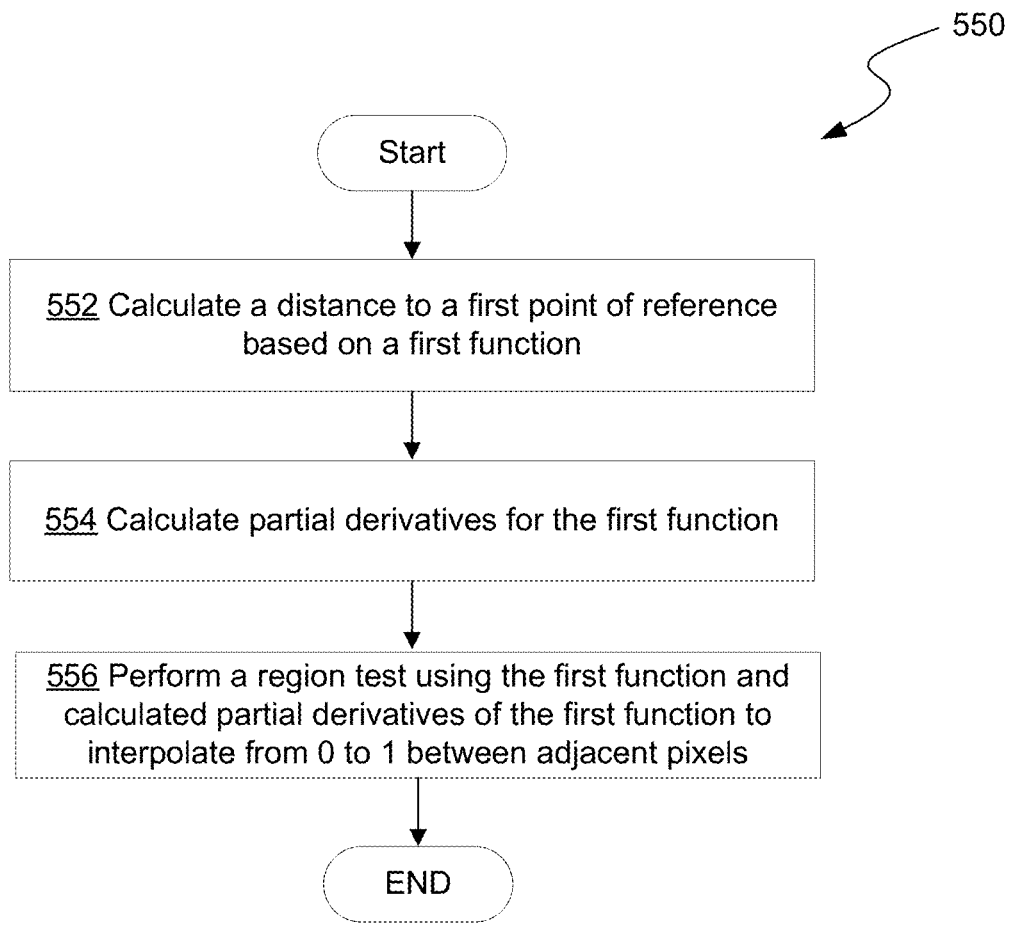
FIG. 5D is a flow diagram describing an example first sub-process of the example fragment shader process of FIG. 5C.

Process 530 continues at step 534 with processing the particular fragment i based on a first shape defined by a first function. As an illustrative example, and as described with respect to FIGS. 7A-9B, this first shape may be a rectangle based on a rectangle function. In some embodiments, the processing at step 534 may include example process 550 described with respect to FIG. 5D. Specifically, as shown in FIG. 5D, process 550 may include, at step 552, calculating a distance to a first point of reference based on a first function. For example, step 552 may include calculating an x and y distance to a central axis of the quad from the particular fragment i.

Where an anti-aliasing effect is desired, example process 550 can continue at step 554 with calculating partial derivatives for the first function (e.g. a rectangle function) and at step 556 with performing a region test using the first function (e.g., a returned distance value) and calculated partial derivatives of the first function to interpolate from 0 to 1 between adjacent pixels. These interpolated values may be used in a final transparency mask that may, in part, define a transparency value for the particular fragment i.

Figure 5E:
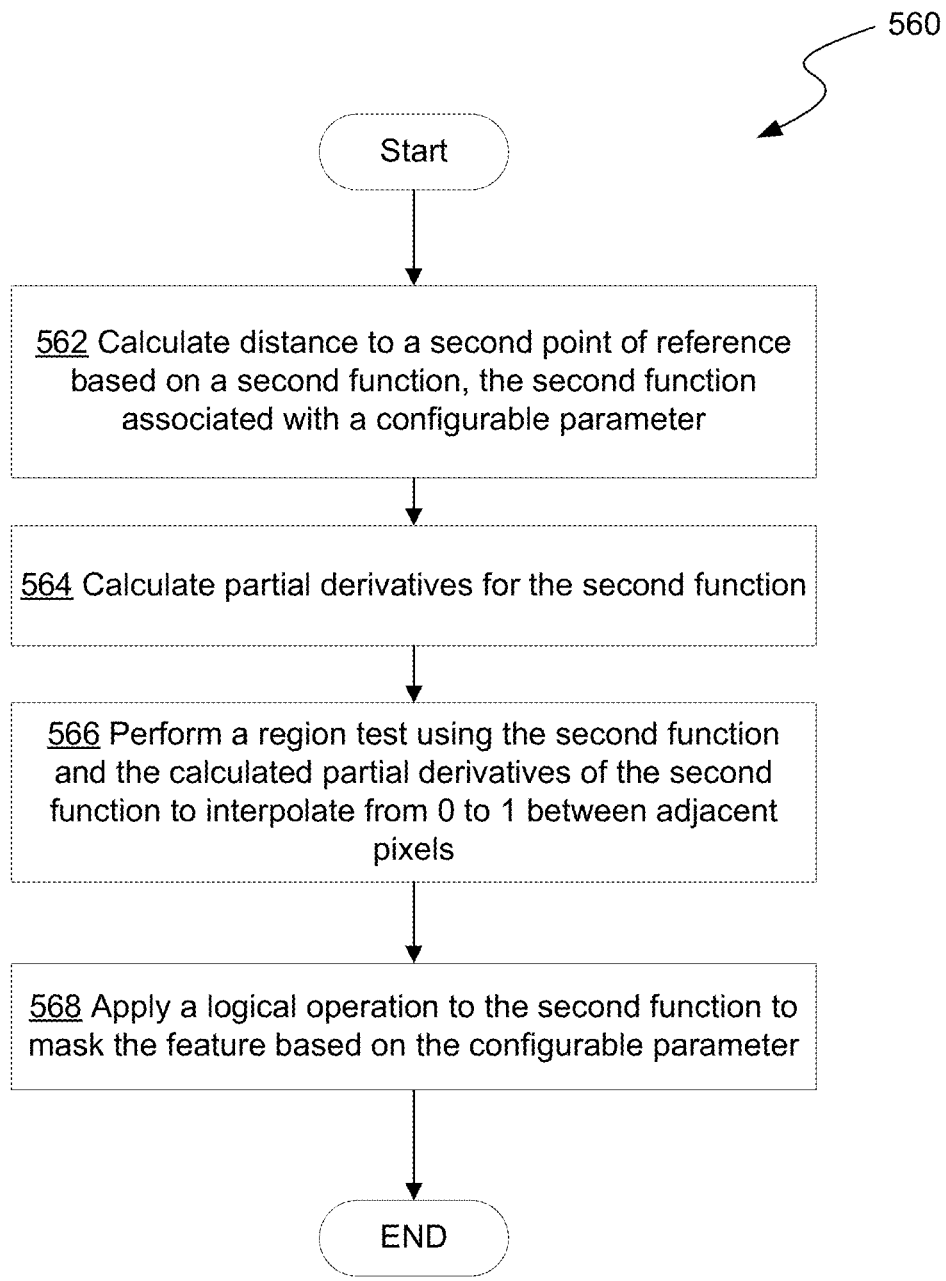
FIG. 5E is a flow diagram describing an example second sub-process of the example fragment shader process of FIG. 5C.

Returning to FIG. 5C, example process 530 continues at step 536 with processing the particular fragment i based on a second shape defined by a second function. As an illustrative example, and as described with respect to FIGS. 9A-9B, this second shape may be a circle based on a circle function and may be used to define rounded corners applied to a rectangle (e.g., the first shape). In some embodiments, the processing at step 536 may include example process 560 described with respect to FIG. 5E. Specifically, as shown in FIG. 5E, process 560 may include, at step 562, calculating a distance to a second point of reference based on second function. For example, step 562 may include calculating a distance (e.g. a radius) to a point relative to a corner of a rectangle from the particular fragment i.

As previously discussed, in some embodiments, functions defining one or more shapes may be associated with a configurable parameter. Specifically, this configurable parameter may be associated with a feature defined by a shape. For example, a circle function may be associated with a configurable parameter defining a radius of the resulting circle. This circle function may be associated with a feature (i.e., a rounded corner) of a resulting composite shape (e.g., as described with respect to FIGS. 9A-9B). The value set for a configurable parameter may be based on a number of different factors. For example, in some embodiments, the value set for a particular configurable parameter may be based on a user input. A user may input a value, for example, to set the radius of rounded corners in a rectangular shape. In some embodiments the configurable parameter may be set, for example, by a user interacting with a displayed image of a graphical element. For example, a user might click a corner of a displayed rectangle and drag the corner in one or more directions to apply a feature in the form of curved corner to the rectangle.

Where feature retention is desired, process 560 may operate between the scaled primitive object and an unscaled value of the configurable parameter. In other words, regardless of the scale factor applied to the primitive object, the feature (i.e., rounded corner of a particular radius) is maintained by not scaling or at least independently scaling the configurable parameter.

Where an anti-aliasing effect is desired, example process 560 can continue at step 564 with calculating partial derivatives for the second function (e.g. a circle function) and at step 566 with performing a region test using the second function (e.g., a returned distance value) and the calculated partial derivatives of the second function to interpolate from 0 to 1 between adjacent pixels. These interpolated values may be used in a final transparency mask that may define a transparency value for the particular fragment i.

Example process 560 continues at step 568 with applying a logic operation to the second function to mask the desired feature based on the configurable parameter. For example, if the feature is a rounded corner defined by a circle function, step 568 may involve applying a logic operation (e.g., simulated by arithmetic operations) to the circle function to exclude portions of the circle not forming the rounded corner.

Returning to FIG. 5C, example process 530 continues at step 538 with processing the particular fragment i based on composite of the first shape and the second shape. In some embodiments this may include at step 539, applying Boolean operations (e.g., simulated by arithmetic operations), for example, to outputs of the aforementioned processing steps, to generate a final transparency mask that will be applied to the particular fragment i.

Example process 530 then continues at step 540 with outputting values for the particular fragment i. As described, the output values may include color values based on a color or texture applied by the shader as well as a transparency value based on the defined shape(s) and in some cases applied anti-aliasing effect. For example, the transparency value may be based, at least in part, on the final transparency mask generated at step 539.

As indicated in FIG. 5C, once values are determined for the particular fragment i, the steps 534-540 of process 530 may repeat for up to n fragments comprising the rendered image.

Example Displays of Graphical Elements

Figure 11:
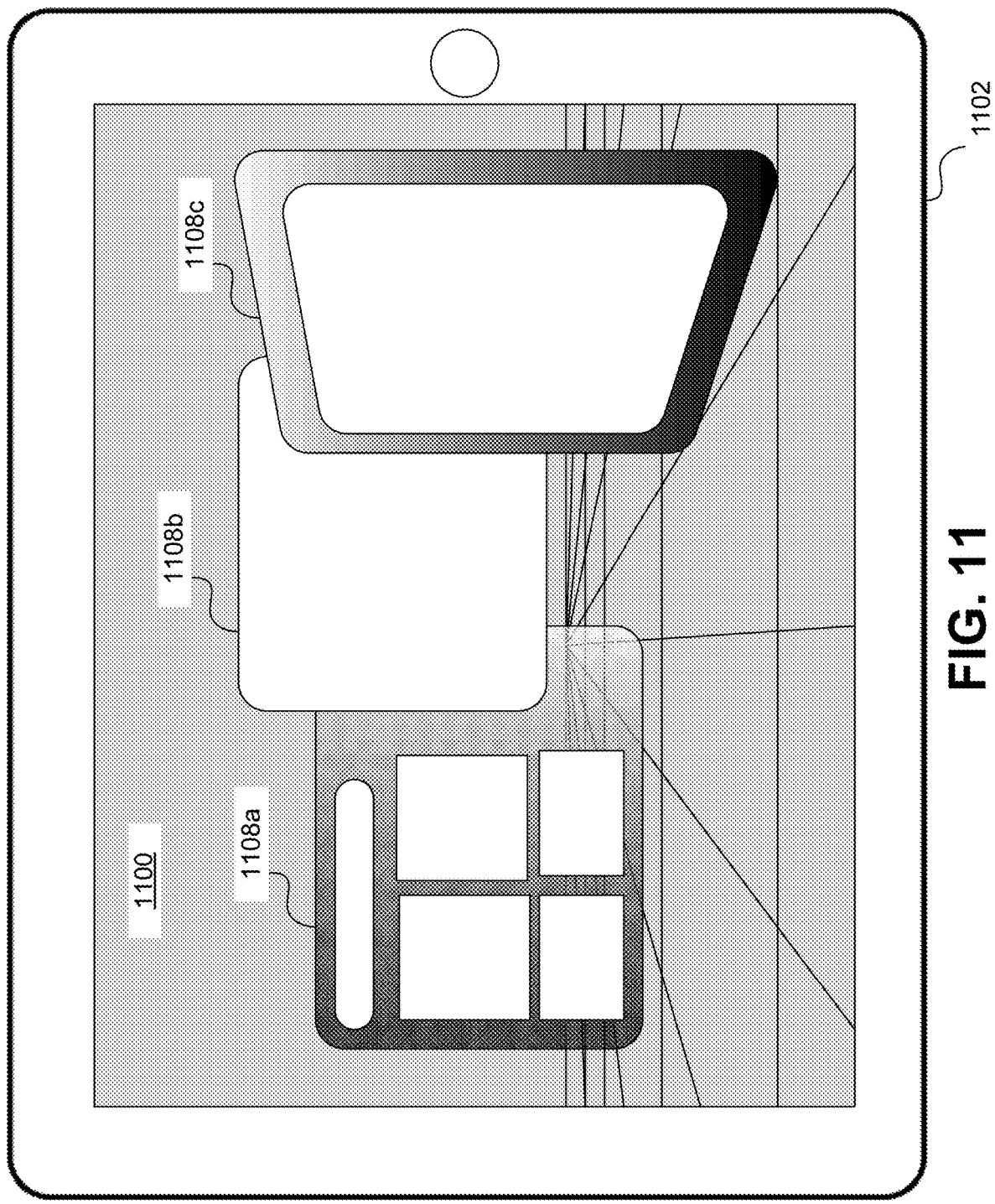
FIG. 11 shows an example display of graphical elements via a first display device type.
Figure 12:
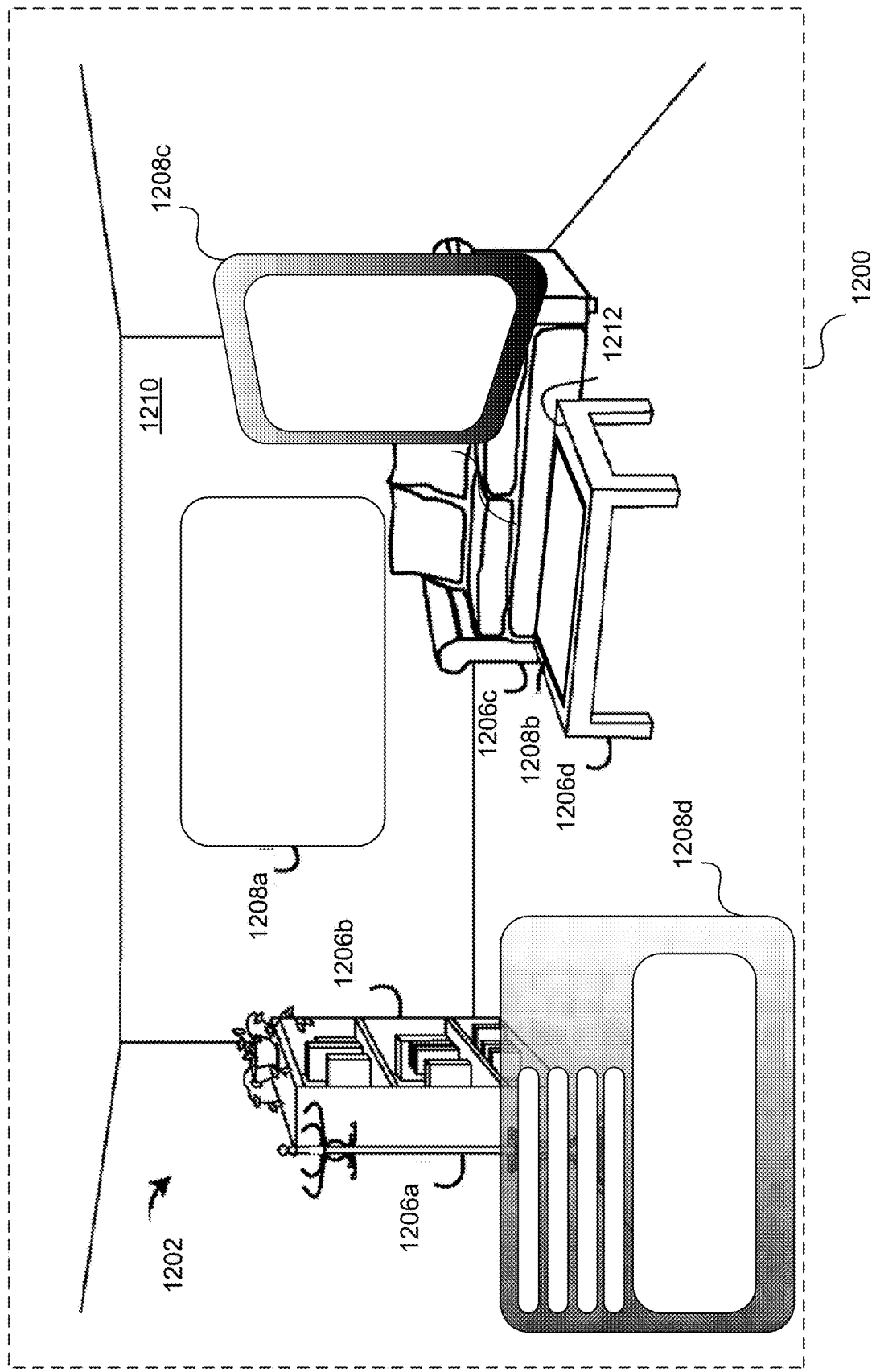
FIG. 12 shows an example display of graphical elements via a second display device type.

The previously described methods for defining and rendering shapes can be applied to a number of applications such as games, graphical user interfaces, or any other applications that may utilize generated graphics. FIGS. 11 and 12 show example ways in which graphical elements may be displayed via a display device. In some embodiments the example graphical elements may include views of shapes defined and rendered according to the previously described processes.

FIG. 11 shows an example rendered image 1100 of several graphical elements 1208*a-c* displayed via a display device 1102 (e.g., in the form of a tablet computer). The display device 1102 may include one or more of the functional components described with respect to computer system 200 shown in FIG. 2.

As show in FIG. 11, the rendered view 1100 includes a 2D representation of the one or more graphical elements 1108*a-c* residing in a 3D world space. Additional information on a 3D graphics pipeline, including the transformation from a model space and/or world space to a screen space of a rendered view is described with respect to FIG. 4. In some embodiments graphical elements may be rendered to appear 2D. For example, graphical elements 1108*a* and 1108*b* are rectangles with rounded corners that are rendered to appear flat to the viewing user. For example, where defined relative to a quad existing in a 3D world space, a virtual camera may be oriented perpendicular to a plane of the quad resulting in a screen view that parallels the plane of the quad. In some embodiments, 2D graphical elements may be rendered so as to appear in 3D. For example, graphical element 1108*c* may be a rectangular shape with rounded corners similar to graphical elements 1108*a-b*, but may reside on a quad oriented differently in the 3D world space.

In some embodiments, graphical elements may be rendered and displayed so as to be opaque (e.g., graphical elements 1108*b-c*) or partially transparent (e.g., graphical element 1108*a*). An opaque graphical element may be rendered so as to occlude other graphical elements that occupy the world space behind the graphical element.

The example view 1100 depicted in FIG. 11 may be part of any type of application. In some embodiments, graphical elements 1108*a-c* may be particularly suited for use as graphical elements in a GUI of some type. For example, graphical elements may be rendered and displayed to represent windows, menus, icons, interactive mechanisms (buttons, toggles, sliders, etc.), or any other types of elements that are part of a GUI.

A person having ordinary skill, will recognize that these are only examples, of how rendered views may appear and that, in other embodiments, graphical elements may be rendered and displayed differently.

FIG. 12 shows an example view 1200 of graphical elements displayed via an augmented reality (AR) interface. Specifically, FIG. 12 shows a first-person perspective of a user viewing a physical environment 1202 including real objects 1206*a*, 1206*b*, 1206*c*, and 1206*d* through a display device. in some embodiments, the display device may be a smart phone device or a tablet device. In such embodiments, the view of the physical environment 1202 (including real objects 1206*a-d*) may represent a display of images and/or video captured by a camera associated with the display device (e.g., an integrated camera in a smart phone). The view presented to the user through such a device may include a composite of the captured images of the physical environment 1202 and rendered graphical elements such that the graphical elements appear to occupy the physical environment. In other embodiments, the display device may be a head-mounted display (HMD) device, or more specifically a near-eye-display (NED) device, for example, as described in more detail with respect to FIG. 2. In an NED device a computer system may generate graphical elements 1208*a-d* that are then projected into the eye of the user, for example, via a transparent waveguide of an NED device. In other words, a display module of the NED device would not display the real world objects 1206*a-d*, but the user would be able to see them because light reflecting off of the real world objects 1206*a-d* would pass through the transparent waveguide of the NED device to the eyes of the user. As shown in FIG. 12, the graphical elements 1208*a-d* may be displayed to overlay the users view of the physical environment 1202. In some embodiments, graphical elements may be displayed so as to appear, from the perspective of a user, to be integrated with one or more real objects in the physical environment 1202.

In particular, FIG. 12 shows a graphical element 1208*a* rendered and displayed so as to appear to be mounted to a wall 1210. In such an embodiment, the graphical element 1208*a* may be rendered in the form of a virtual monitor. Although not shown in FIG. 12, the example graphical element 1208*a* in the form of a virtual monitor may include a generated 2D and/or 3D graphical elements representing a boundary of the virtual monitor and may display within the boundary of the virtual monitor images and/or video.

Similarly, FIG. 12 shows another graphical element 1208*b* rendered and displayed so as to appear to be set upon a top surface of the real table 1212. In such an embodiment, the example graphical element 1208*b* may be rendered in the form of a virtual interactive surface (e.g., a virtual board game, map, etc.). Although not shown in FIG. 12, the example graphical element 1208*b* in the form of a virtual interactive surface may include generated 2D and/or 3D graphical interactive elements. For example, multiple users wearing NED devices could play a virtual interactive game by interacting with the graphical element 1208*b* displayed so as to appear to be set on the top surface of the table 1212.

In some embodiments, graphical elements may be displayed relative to a frame of reference of the physical environment 1202, but otherwise unbound to a physical surface. For example, graphical element 1208*c* is rendered and displayed so as to appear, from the point of view of a user to float in free space.

In each of the aforementioned examples, the rendering and display of the graphical elements 1208*a-c* would change as the user moves though the physical environment and their point of view changes. In some embodiments, graphical elements may also be rendered and displayed so as to always appear the same from the user's perspective. For example, graphical element 1208*d* may be displayed so as to retain its position and/or orientation relative to the user's perspective. Such a graphical element could be used, for example for an interface menu through which a user may interact with the NED device being worn.

The example graphical elements 1208*a-d* shown in FIG. 12 are provided for illustrative purposes, and are not to be construed as limiting. As previously described, Graphical elements may be rendered to have any appearance without departing from the scope of this disclosure.

In some embodiments, graphical elements may be rendered and displayed so as to be opaque (e.g., graphical elements 1208*a-c*) or partially transparent (e.g., graphical element 1208*d*). An opaque graphical element may be rendered so as to occlude real world objects that appear to be behind the graphical element. A partially transparent graphical element may be rendered so that real world objects or other graphical elements can be viewed through the partially transparent graphical element.

Graphical elements may be rendered and displayed so as to appear to have or not have depth. For example, when viewed from an angle, a depthless graphical element will not appear to have any structure behind the surface. Alternatively, in some embodiments, graphical elements may be rendered and displayed, such that when viewed from an angle the graphical element will appear to occupy space behind the a surface.

Even where graphical elements are based on 2D primitives (e.g. a quad mesh), they may nevertheless occupy a 3D space (e.g. the 3D space of the physical environment 1202 from the point of view of the user). Accordingly, the graphical elements may appear to the user as 3D virtual objects. In some embodiments, stereoscopic display techniques may be utilized to provide this effect. Specifically, two different views (from offset virtual camera angles) of a world space in which the graphical element resides may be rendered and displayed to each eye of the user via the NED device.

As previously described, graphical elements may be rendered and displayed in a stationary location relative to real world objects in the physical environment 1202, or the graphical elements may be rendered and displayed so as to move relative to real world objects. A stationary graphical element may appear, to the user, to be fixed to a wall, table, or other surface, for example. A stationary graphical element may also appear to be floating apart from any real world objects.

A moving graphical element may appear to move in a constrained or unconstrained fashion. For example, a graphical may be constrained to a physical wall, but the graphical element may move along the wall as a user walks by the wall. As another example, a graphical element may be constrained to a physical object moving through the physical environment. As yet another example, a graphical element may not be constrained to any physical objects and may appear to float directly in front of a user regardless of where the user looks.

A graphical element may be either a private or public. A private graphical element is rendered and displayed via only one display device so only the user viewing the physical space through the one display device sees the graphical element. A public graphical element may be concurrently rendered and displayed on one or more other devices, including other see-through displays, so that other people may view another instance of the graphical element.

In some embodiments, a rendering engine may be configured to map a virtual coordinate system to the physical environment such that graphical elements appears to be at a particular physical-space location. Furthermore, the virtual coordinate system may be a shared coordinate system useable by one or more other display devices. In such a case, each separate display device may recognize the same physical space location where the graphical element is to appear. Each display device may then render the graphical element at that physical space location so that two or more users viewing the physical space location through different display devices will see what appears to be the same graphical element, albeit perhaps from a different point of view. In other words, the particular physical-space location at which one display device renders and displays a graphical element will be the same physical-space location that another display device renders and displays the graphical element.

EXAMPLES OF CERTAIN EMBODIMENTS

Certain embodiments of the technology introduced herein are summarized in the following numbered examples:

1. A method comprising defining, by a computer system, a shape based on a function, the shape including a boundary separating an area within the shape from an area outside of the shape, rendering, by the computer system, an image of the shape, by generating a plurality of fragments, wherein generating the plurality of fragments includes determining transparency values, based on the function defining the shape, for fragments corresponding to the boundary of the shape in the rendered image, and causing display, by the computer system, via the display device, of the rendered image of the shape.

2. The method of example 1, wherein the transparency values for the fragments corresponding to the boundary of the defined shape in the rendered image result in an anti-aliased effect in the display of the rendered image of the shape.

3. The method of example 1 or example 2, wherein the shape is defined relative to a primitive object in a 3-dimensional world space.

4. The method of any of examples 1 through 3, wherein the primitive object is a quadrilateral primitive ("quad"), the quad including four vertices and four edges connecting the four vertices.

5. The method of any of examples 1 through 4, wherein the function defining the shape is based on a distance to a central axis of the quad.

6. The method of any of examples 1 through 5, further comprising dynamically updating the rendering and display of the image of the shape in response to a detected change in a parameter corresponding to the primitive object.

7. The method of any of examples 1 through 6, wherein fragments corresponding to the boundary of the shape in the rendered image are identified based on a calculated partial derivative of the function defining the shape.

8. The method of any of examples 1 through 7, wherein the transparency values are determined based on a calculated partial derivative of the function defining the shape.

9. The method of any of examples 1 through 8, wherein the rendered image of the defined shape corresponds with an interactive graphical element in a graphical user interface displayed via the display device.

10. The method of any of examples 1 through 9, wherein the display device is a near-eye-display (NED) device.

11. The method of any of examples 1 through 10, wherein the rendering of the image of the shape is performed at least in part by executing, by the computer system, instructions associated with a shader module.

12. A computer system comprising a processor and a memory having instructions stored thereon, which when executed by the processor, cause the computer system to define a shape based on a function, the shape including a boundary separating an area within the shape from an area outside of the shape, render an image of the shape by generating a plurality of fragments, wherein generating the plurality of fragments includes determining, based on the function defining the shape, transparency values for fragments corresponding to the boundary of the shape in the rendered image, and cause display, via the display device, of the rendered image of the shape.

13. The computer system of example 12, wherein the transparency values for the fragments corresponding to the boundary of the shape result in an anti-aliased effect in the display of the rendered image of the shape.

14. The computer system of example 12 or example 13, wherein the shape is defined relative to a primitive object in a 3-dimensional world space.

15. The computer system of any of examples 12 through 14, wherein the primitive object is a quadrilateral primitive ("quad"), the quad including four vertices and four edges connecting the four vertices.

16. The computer system of any of examples 12 through 15, wherein the memory unit has further instructions stored thereon, which when executed by the processing unit, cause the computer system to further dynamically update the rendering and display of the image of the shape in response to a detected change in a parameter corresponding to the primitive object.

17. The computer system of any of examples 12 through 16, wherein determining transparency values for fragments corresponding to the boundary of the shape includes identifying, based on a calculated partial derivative of the function defining the shape, the fragments corresponding to the boundary of the shape.

18. The computer system of any of examples 12 through 17, wherein determining transparency values for fragments corresponding to the boundary of the shape includes calculating a partial derivative of the function defining the shape.

19. The computer system of any of examples 12 through 18, wherein the rendered image of the shape corresponds to an interactive graphical element in a graphical user interface displayed via the display device.

20. A non-transitory computer-readable medium storing instructions, which when executed by a computer system, cause the computer system to define a shape based on a function, the shape including a boundary separating an area within the shape from an area outside of the shape, render a view of the defined shape, wherein rendering the view of the defined shape includes generating a plurality of fragments corresponding to a plurality of pixels in a display device, wherein fragments corresponding to the boundary of the defined shape in the rendered view include transparency values calculated based on the function defining the shape, and cause display, via a display device, of the rendered view of the defined shape.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   defining, by a computer system, a shape based on a function, the shape including a boundary separating an area within the shape from an area outside of the shape;
   rendering, by the computer system, an image of the shape, by generating a plurality of fragments, wherein generating the plurality of fragments includes:
      calculating partial derivatives of the function at each of the plurality of fragments, where each of the partial derivatives of the function include the difference in values between two or more adjacent fragments;
      identifying, from the plurality of fragments and based on the partial derivatives, fragments corresponding to the boundary of the shape and fragments that do not correspond to the boundary of the shape; and
      setting, according to corresponding values of the partial derivatives, transparency values for the identified fragments corresponding to the boundary of the shape; and
   causing display, by the computer system, via the display device, of the rendered image of the shape with anti-aliasing based on the plurality of fragments including the identified fragments corresponding to the boundary of the shape.

2. The method of claim 1, wherein the transparency values for the fragments corresponding to the boundary of the defined shape in the rendered image result in an anti-aliased effect in the display of the rendered image of the shape.

3. The method of claim 1, wherein the shape is defined relative to a primitive object in a 3-dimensional world space.

4. The method of claim 1, wherein the primitive object is a quadrilateral primitive ("quad"), the quad including four vertices and four edges connecting the four vertices.

5. The method of claim 4, wherein the function defining the shape is based on a distance to a central axis of the quad.

6. The method of claim 3, further comprising:
   dynamically updating the rendering and display of the image of the shape in response to a detected change in a parameter corresponding to the primitive object.

7. The method of claim 1, wherein the fragments corresponding to the boundary of the shape in the rendered image are identified based on the partial derivatives of the function defining the shape.

8. The method of claim 1, wherein the transparency values are determined based on the partial derivatives of the function defining the shape.

9. The method of claim 1, wherein the rendered image of the defined shape corresponds with an interactive graphical element in a graphical user interface displayed via the display device.

10. The method of claim 1, wherein the display device is a near-eye-display (NED) device.

11. The method of claim 1, wherein the rendering of the image of the shape is performed at least in part by executing, by the computer system, instructions associated with a shader module.

12. A computer system comprising:
   a processor; and
   a memory having instructions stored thereon, which when executed by the processor, cause the computer system to:
      define a shape based on a function, the shape including a boundary separating an area within the shape from an area outside of the shape;
      render an image of the shape by generating a plurality of fragments;
      wherein generating the plurality of fragments includes:
         calculating partial derivatives of the function at each of the plurality of fragments, where each of the partial derivatives of the function include the difference in values between two or more adjacent fragments;
         identifying, from the plurality of fragments and based on the partial derivatives, fragments corresponding to the boundary of the shape and fragments that do not correspond to the boundary of the shape; and
         setting, according to corresponding values of the partial derivatives, transparency values for the identified fragments corresponding to the boundary of the shape; and
      cause display, via the display device, of the rendered image of the shape with anti-aliasing based on the plurality of fragments including the identified fragments corresponding to the boundary of the shape.

13. The computer system of claim 12, wherein the transparency values for the fragments corresponding to the boundary of the shape result in an anti-aliased effect in the display of the rendered image of the shape.

14. The computer system of claim 12, wherein the shape is defined relative to a primitive object in a 3-dimensional world space.

15. The computer system of claim 12, wherein the primitive object is a quadrilateral primitive ("quad"), the quad including four vertices and four edges connecting the four vertices.

16. The computer system of claim 14, wherein the memory unit has further instructions stored thereon, which when executed by the processing unit, cause the computer system to further:
dynamically update the rendering and display of the image of the shape in response to a detected change in a parameter corresponding to the primitive object.

17. The computer system of claim 12, wherein determining the transparency values for the fragments corresponding to the boundary of the shape includes identifying, based on the partial derivatives of the function defining the shape, the fragments corresponding to the boundary of the shape.

18. The computer system of claim 12, wherein determining the transparency values for the fragments corresponding to the boundary of the shape includes calculating the partial derivatives of the function defining the shape.

19. The computer system of claim 12, wherein the rendered image of the shape corresponds to an interactive graphical element in a graphical user interface displayed via the display device.

20. A non-transitory computer-readable medium storing instructions, which when executed by a computer system, cause the computer system to:
define a shape based on a function, the shape including a boundary separating an area within the shape from an area outside of the shape;
render a view of the defined shape, wherein rendering the view of the defined shape includes generating a plurality of fragments corresponding to a plurality of pixels in a display device by:
calculating partial derivatives of the function at each of the plurality of fragments, where each of the partial derivatives of the function include the difference in values between two or more adjacent fragments;
identifying, from the plurality of fragments and based on the partial derivatives, fragments corresponding to the boundary of the defined shape in the rendered view and fragments that do not correspond to the boundary of the defined shape; and
setting, according to corresponding values of the partial derivatives, transparency values for the identified fragments corresponding to the boundary of the defined shape; and
cause display, via a display device, of the rendered view of the defined shape with anti-aliasing based on the plurality of fragments including the identified fragments corresponding to the boundary of the shape.

* * * * *